US009830918B2

(12) United States Patent
Purnhagen et al.

(10) Patent No.: US 9,830,918 B2
(45) Date of Patent: Nov. 28, 2017

(54) ENHANCED SOUNDFIELD CODING USING PARAMETRIC COMPONENT GENERATION

(71) Applicant: DOLBY INTERNATIONAL AB, Amsterdam (NL)

(72) Inventors: Heiko Purnhagen, Sundyberg (SE); Toni Hirvonen, Stockholm (SE); Leif Jonas Samuelsson, Sundbyberg (SE); Lars Villemoes, Järfälla (SE); Janusz Klejsa, Bromma (SE); Harald Mundt, Fürth (DE)

(73) Assignee: Dolby International AB, Amsterdam Zuidoost (NL)

( * ) Notice: Subject to any disclaimer, the term of this patent is extended or adjusted under 35 U.S.C. 154(b) by 19 days.

(21) Appl. No.: 14/900,389

(22) PCT Filed: Jun. 27, 2014

(86) PCT No.: PCT/EP2014/063769
§ 371 (c)(1),
(2) Date: Dec. 21, 2015

(87) PCT Pub. No.: WO2015/000819
PCT Pub. Date: Jan. 8, 2015

(65) Prior Publication Data

US 2016/0155448 A1 Jun. 2, 2016

Related U.S. Application Data

(60) Provisional application No. 61/843,163, filed on Jul. 5, 2013.

(51) Int. Cl.
*G06F 17/00* (2006.01)
*H04R 5/00* (2006.01)
(Continued)

(52) U.S. Cl.
CPC ........ *G10L 19/008* (2013.01); *G10L 19/0204* (2013.01); *G10L 19/0212* (2013.01); *G10L 19/06* (2013.01)

(58) Field of Classification Search
CPC ............... G10L 19/008; G10L 19/0204; G10L 19/0212; G10L 19/06
See application file for complete search history.

(56) References Cited

U.S. PATENT DOCUMENTS 7,558,393 B2 7/2009 Miller, III
7,587,054 B2 9/2009 Elko
(Continued)

FOREIGN PATENT DOCUMENTS

CN 101673548 3/2010
EP 2028648 2/2009
(Continued)

OTHER PUBLICATIONS

Cheng, B. et al "A Spatial Squeezing Approach to Ambisonic Audio Compression" IEEE International Conference on Acoustics, Speech and Signal Processing, Mar. 31, 2008-Apr. 4, 2008, pp. 369-372, Las Vegas, NV.
(Continued)

*Primary Examiner* — Regina N. Holder

(57) ABSTRACT

The present document relates to multichannel audio coding and more precisely to techniques for discrete multichannel audio encoding and decoding. In particular, the present document relates to systems and method for coding soundfields. An audio encoder (200) configured to encode a frame of a soundfield signal (110) comprising a plurality of audio signals is described. The audio encoder (200) comprises a transform determination unit (203, 204) configured to determine an energy-compacting orthogonal transform (V) based on the frame of the soundfield signal (110). Furthermore, the encoder (200) comprises a transform unit (202) configured
(Continued)

Figure 1:
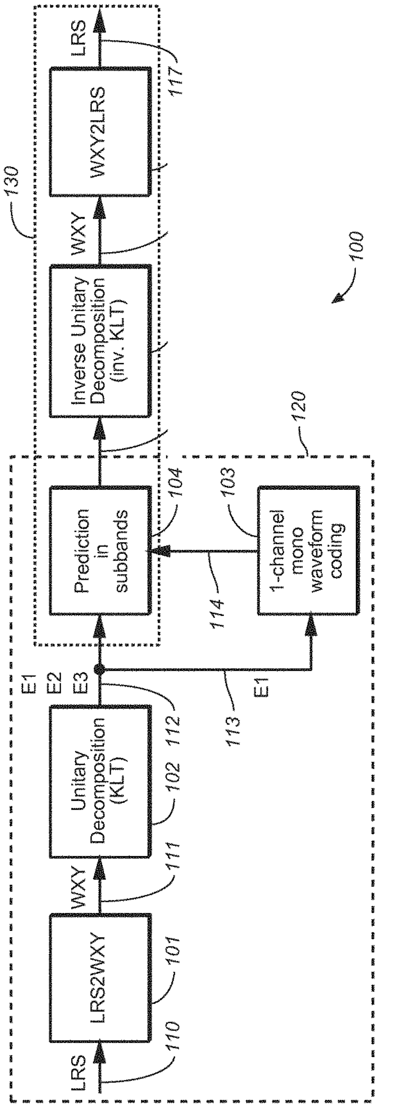

to apply the energy-compacting orthogonal transform (V) to the frame of the soundfield signal (110), and configured to provide a frame of a rotated soundfield signal (112) comprising a plurality of rotated audio signals (E1, E2, E3). The audio encoder (200) comprises a waveform encoding unit (103) configured to encode a first rotated audio signal (E1) of the plurality of rotated audio signals (E1, E2, E3), and a parametric encoding unit (104) configured to determine a set of spatial parameters (ae2, be2) for determining a second rotated audio signal (E2) of the plurality of rotated audio signals (E1, E2, E3) based on the first rotated audio signal (E1).

20 Claims, 4 Drawing Sheets

(51) Int. Cl.

| | |
|---|---|
| ***G10L 19/008*** | (2013.01) |
| ***G10L 19/02*** | (2013.01) |
| ***G10L 19/06*** | (2013.01) |

(56) References Cited

U.S. PATENT DOCUMENTS

| | | | |
|---|---|---|---|
| 8,023,660 | B2 | 9/2011 | Faller |
| 8,238,563 | B2 | 8/2012 | Rumsey |
| 2007/0140499 | A1 | 6/2007 | Davis |
| 2008/0175394 | A1 | 7/2008 | Goodwin |
| 2008/0189120 | A1 | 8/2008 | Oh |
| 2010/0329466 | A1 | 12/2010 | Berges |
| 2011/0022402 | A1 | 1/2011 | Engdegard |
| 2011/0096932 | A1 | 4/2011 | Schuijers |
| 2012/0155653 | A1 | 6/2012 | Jax |
| 2013/0016842 | A1 | 1/2013 | Schultz-Amling |
| 2013/0022206 | A1 | 1/2013 | Thiergart |
| 2015/0221313 | A1 | 8/2015 | Purnhagen |

FOREIGN PATENT DOCUMENTS

| | | |
|---|---|---|
| EP | 2469741 | 6/2012 |
| WO | 2006/052188 | 5/2006 |
| WO | 2009/067741 | 6/2009 |

OTHER PUBLICATIONS

Khaddour, H. "Sound Source Localization Based on B-Format Signals" IEEE 34th International Conference on Telecommunications and Signal Processing, pp. 335-338, Aug. 18-20, 2011, Budapest.

Ben, D. et al "Psychoacoustically Motivated, Frequency Dependent Tikhonov Regularization for Soundfield Parametrization" IEEE International Conference on Acoustics, Speech and Signal Processing, Mar. 14-19, 2010, pp. 141-144, Dallas, TX.

Briand, Manuel, et al "Parametric Representation of Multichannel Audio Based on Principal Component Analysis" AES Convention 120, May 2006, New York, NY, USA.

Yang, Dai, et al "High-Fidelity Multichannel Audio Coding with Karhunen-Loeve Transform" IEEE Transactions on Speech and Audio Processing, vol. 11, No. 4, Jul. 1, 2003, pp. 365-380.

ENHANCED SOUNDFIELD CODING USING PARAMETRIC COMPONENT GENERATION

CROSS REFERENCE TO RELATED APPLICATIONS

This application claims priority to U.S. Provisional Patent Application No. 61/843,163, filed on 5 Jul. 2013, which is hereby incorporated by reference in its entirety.

TECHNICAL FIELD

The present document relates to multichannel audio coding and more precisely to techniques for discrete multichannel audio encoding and decoding. In particular, the present document relates to systems and method for coding soundfields.

BACKGROUND

Teleconferencing systems that are able to deliver a spatial audio scene typically have an advantage over monophonic systems. In particular, teleconferencing systems which deliver a spatial audio scene provide a more compelling experience, since a spatial audio scene allows users to clearly identify who is speaking and what is being said, even in dynamic conversations comprising a plurality of partially concurrent talkers.

A technical problem that appears in the context of designing such teleconferencing systems is the provision of an efficient description of the spatial audio scene. Furthermore, in order to allow for efficient transmission of the description of the spatial audio scene, there is a need for efficient coding algorithms for the particular description of the spatial audio scene. In the present document, a particular class of descriptions of spatial audio scenes is described which involves usage of so-called soundfield signals (e.g., B-format signals, G-format signals, Ambisonics™ signals). The present document focuses on the efficient coding of such soundfield signals.

There are several constraints that are relevant to the design of a coding algorithm for a teleconferencing system. For example, it is typically required that the delay due to the coding is kept relatively low. As a result, coding is typically performed on a per-frame basis, where the frame duration is selected to fit the delay requirement (e.g. 20 ms). In addition, it is often desired to devise a coding algorithm that facilitates independent coding of frames, as this is known to simplify the decoding if there are transmission losses.

A further aspect regarding the design of a coding algorithm is related to the relation and/or trade-off between the operating bit-rate and the resulting perceptual quality. The design goal is usually to reduce (e.g. minimize) the bit-rate, while maintaining at least satisfactory perceptual quality.

The focus of the present document is related to the coding of soundfield signals at low bit-rates (in the range of 24 kbit/s or less per channel of a soundfield signal). In this context a parametric coding scheme for soundfield signals is described, which is a particularly efficient method that provides a reasonable trade-off between the operating bit-rate and the perceptual quality, at relatively low operating bit-rates. Furthermore, the described parametric coding scheme for soundfield signals allows for an improved layered decoding of the encoded soundfield signals, thereby enabling the integration of monophonic terminals into a soundfield teleconferencing system.

SUMMARY

According to an aspect an audio encoder configured to encode a frame of a soundfield signal comprising a plurality of audio signals is described. The soundfield signal may have been captured at a terminal of a teleconferencing system using a microphone array. As such, the soundfield signal may be represented in the captured domain (e.g. the LRS domain). The audio encoder may be integrated into the terminal (or client) of the teleconferencing system. The soundfield signal may describe a 2-dimensional audio signal describing sound sources at one or more azimuth angles around the terminal. Such 2-dimensional soundfield signals may comprise at least three audio signals (e.g. an L, an R and an S signal).

The audio encoder may comprise a non-adaptive transform unit configured to apply a non-adaptive transform M(g) to the frame of the soundfield signal to provide a transformed soundfield signal comprising a plurality of transformed audio signals (e.g. the audio signals W, X and Y). The original soundfield signal may be referred to as the soundfield signal in the captured domain (e.g. the LRS domain) and the transformed soundfield signal may be referred to as the soundfield signal in the non-adaptive transform domain (e.g. the WXY domain).

The audio encoder may comprise a transform determination unit configured to determine an energy-compacting orthogonal transform V (e.g. a Karhunen-Loève transform, KLT) based on the frame of the soundfield signal. In particular, the transform determination unit may be configured to determine the energy-compacting orthogonal transform V based on the transformed soundfield signal, i.e. based on the soundfield signal in the non-adaptive transform domain. The transform determination unit may be configured to determine a set of transform parameters (e.g. the transform parameters d, $\phi$, $\theta$) for describing the energy compacting transform V. The set of transform parameters may be quantized in order to allow for an efficient transmission to a corresponding audio decoder. In case of a soundfield signal comprising three audio signals, the energy compacting transform V may be given by $$V(d,\varphi,\theta)=\left[\begin{bmatrix} c(1-d) & 0 & cd \\ cd\cos\varphi & -\sin\varphi & -c(1-d)\cos\varphi \\ cd\sin\varphi & \cos\varphi & -c(1-d)\sin\varphi \end{bmatrix}\begin{bmatrix} 1 & 0 & 0 \\ 0 & \cos\theta & -\sin\theta \\ 0 & \sin\theta & \cos\theta \end{bmatrix}\right]^T,$$

with $c=1/\sqrt{(1-d)^2+d^2}$, and with the set of transform parameters comprising the parameters d, $\phi$, and $\theta$.

The transform determination unit may be configured to determine a covariance matrix based on the plurality of audio signals of the frame of the soundfield signal (e.g. based on the plurality of the audio signals of the frame of the transformed soundfield signal). Furthermore, the transform determination unit may be configured to perform an eigenvalue decomposition of the covariance matrix to provide the energy compacting transform V. The transform V may comprise the eigenvectors of the covariance matrix.

The audio encoder may comprise a transform unit configured to apply the energy-compacting orthogonal transform V to a frame derived from the frame of the soundfield signal. In particular, the transform V may be applied to the plurality of audio signals of the transformed soundfield signals (i.e. of the soundfield signals in the non-adaptive transform domain). By doing this, a frame of a rotated soundfield signal comprising a plurality of rotated audio signals (e.g. the audio signals E1, E2, E3) may be provided. The plurality of rotated audio signals may also be referred to as a soundfield signal in the adaptive transform domain.

The audio encoder may comprise a waveform encoding unit configured to encode a first rotated audio signal (e.g. the signal E1) of the plurality of rotated audio signals. The first rotated audio signal may correspond to the rotated audio signal of the plurality of rotated audio signals, which is associated with the relatively highest energy (e.g. with the highest eigenvalue). The waveform encoding unit may be configured to encode the first rotated audio signal using a sub-band domain audio and/or speech encoder. As such, the audio encoder may be configured to waveform encode (only) the first rotated audio signal. The one or more others of the plurality of rotated audio signals may be encoded in a parametric manner, in dependence on the first rotated audio signal.

For this purpose, the audio encoder may comprise a parametric encoding unit configured to determine a set of spatial parameters (e.g. the prediction parameter ae2 and/or the energy adjustment gain be2) for determining a second rotated audio signal (e.g. the signal E2) of the plurality of rotated audio signals based on the first rotated audio signal. In particular, the second rotated audio signal may be determined (only) based on the (reconstructed) first rotated audio signal and based on the set of spatial parameters, without the need to waveform encode the second rotated audio signal.

The parametric encoding unit may be configured to determine the set of spatial parameters (e.g. ae2, be2) based on the signal model E2=ae2*E1+be2*decorr2(E1), with ae2 being a second prediction parameter (or prediction gain), with be2 being a second energy adjustment gain and with decorr2(E1) being a second decorrelated version of the first rotated audio signal (referred to as the signal E1). As such, the set of spatial parameters comprises the second prediction parameter ae2 and the second energy adjustment gain be2. In the above terminology the word "second" is used to indicate that the respective entities are used to determine the second rotated audio signal. In a similar manner the word "third" may be used to indicate that the respective entities are used to determine a third rotated audio signal, etc.

The parametric encoding unit may be configured to determine the second prediction parameter ae2 based on the second rotated audio signal E2 and based on the first rotated audio signal E1. The second prediction parameter ae2 enables a corresponding decoder to estimate a correlated component of the second rotated audio signal E2 based on the first rotated audio signal E1. The correlated component of the second rotated audio signal E2 may be substantially correlated to the first rotated audio signal E1.

The parametric encoding unit may be configured to determine the second prediction parameter ae2 such that a mean square error (MSE) of a prediction residual between the second rotated audio signal E2 and the correlated component of the second rotated audio signal E2 is reduced (e.g. minimized). Even more particularly, the parametric encoding unit may be configured to determine the second prediction parameter ae2 using the formula $ae2=(E1^T*E2)/(E1^T*E1)$, wherein the symbol $^T$ indicates the transposition operation.

Furthermore, the parametric encoding unit may be configured to determine a second energy adjustment gain be2 based on the second rotated audio signal E2 and based on the first rotated audio signal E1. The second energy adjustment gain be2 enables a corresponding decoder to estimate a decorrelated component of the second rotated audio signal E2 based on the first rotated audio signal E1. The decorrelated component of the second rotated audio signal E2 may be substantially decorrelated from the first rotated audio signal E1.

The parametric encoding unit may be configured to determine the second energy adjustment gain be2 based on a ratio of an amplitude or energy of the prediction residual and an amplitude or energy of the first rotated audio signal E1. In particular, the parametric encoding unit may be configured to determine the second energy adjustment gain be2 based on a ratio of the root mean square (RMS) value of the prediction residual and the root mean square value of the first rotated audio signal E1. Even more specifically, the parametric encoding unit may be configured to determine the second energy adjustment gain be2 using the formula be2=norm(E2−ae2*E1)/norm(E1), with norm( ) being a root mean square operation. Alternatively, different amplitude or energy norms of the prediction residual and of the first rotated audio signal E1 may be used. By way of example, the norm( ) operator may correspond to an $L^2$ norm.

The parametric encoding unit may be configured to determine a second decorrelated signal (e.g. decorr2(E1)), based on the first rotated audio signal E1. Furthermore, the parametric encoding unit may be configured to determine a second indicator of the energy (e.g. the root mean square value) of the second decorrelated signal and a first indicator of the energy (e.g. the root mean square value) of the first rotated audio signal E1. The parametric encoding unit may be configured to determine the second energy adjustment gain be2 based on the second decorrelated signal, if the second indicator is greater than the first indicator. In particular, the second decorrelated signal may be used instead of the first rotated audio signal E1 in order to determine the second energy adjustment gain be2. On the other hand, if the second indicator is smaller than or equal to the first indicator, the second energy adjustment gain be2 may be determined based on the first rotated audio signal and not based on the second decorrelated signal. This limitation of the second energy adjustment gain be2 may be beneficial for improving the perceptual audio quality, in case of transients comprised within the to-be-encoded soundfield signal.

The audio encoder may comprise a time-to-frequency analysis unit (also referred to as a T-F transform unit) configured to convert a frame of a soundfield signal into a plurality of sub-bands, such that a plurality of sub-band signals are provided for the plurality of rotated audio signals, respectively. The time-to-frequency analysis unit may be positioned at different locations within the audio encoder, e.g. upstream of the non-adaptive transform unit, downstream of the non-adaptive transform unit (performing the transform M(g)), or upstream of the transform unit (performing the transform V). As such, the waveform encoding of the first rotated audio signal E1 and/or the parametric encoding of the one or more others of the plurality of rotated audio signals E1, E2, E3 may be performed in the sub-band domain. The individual sub-bands may comprise a plurality of frequency bins (e.g. MDCT bins). The number of frequency bins per sub-band may increase with increasing frequency (in accordance to perceptual motivations). As such, the sub-band structure may be perceptually motivated.

The parametric encoding unit may be configured to determine a different set of spatial parameters for each of the plurality of sub-band signals of the second rotated audio signal. As such, the parametric encoding of the second rotated audio signal (and possibly of further rotated audio signals) may be performed on a per sub-band basis. On the other hand, the transform determination unit may be configured to determine a single energy-compacting orthogonal transform V for the plurality of sub-bands. The transform unit may be configured to apply the single energy-compacting orthogonal transform V to the frame derived from the soundfield signal in the plurality of sub-bands. As such, a single transform V may be determined for and applied to the plurality of sub-bands. Consequently, only a single set of transform parameters may be required to describe the transform V. This may be beneficial with respect to the stability of the transform V and with respect of the perceptual quality of the first rotated audio signal E1 (which may also be referred to as the down-mix signal). Furthermore, the combination of a broadband transform V (which has been determined based on and for a plurality of sub-bands) and narrowband parametric encoding (which is performed on a per sub-band basis) provides an improved trade-off between coding efficiency (reflected by the number of to-be-encoded transform parameters and spatial parameters) and perceptual quality of the coded soundfield.

As indicated above, the soundfield signal may comprise at least three audio signals which are indicative at least of an azimuth distribution of talkers around the terminal of the teleconferencing system, which comprises or which makes use of the audio encoder. The parametric encoding unit may be configured to determine a further set of spatial parameters (e.g. ae3, be3) for determining a third rotated audio signal (e.g. E3) of the plurality of rotated audio signals, based on the first rotated audio signal E1 (and based on the further set of spatial parameters). The further set of spatial parameters ae3, be3 may be determined in a similar manner to the set of spatial parameters ae2, be2.

The parametric encoding unit may be configured to determine a correlation parameter (e.g. the parameter γ) indicative of a correlation between the second rotated audio signal E2 and the third rotated audio signal E3. The correlation parameter may be inserted into a spatial bit-stream to be provided to the corresponding audio decoder. The corresponding audio decoder may use the correlation parameter to generate a second decorrelated signal (e.g. decorr2(E1)) and a third decorrelated signal (e.g. decorr3(E1)) such that the correlation of the second rotated audio signal E2 and the third rotated audio signal E3 is reinstated more precisely at the corresponding audio decoder. In particular, the second decorrelated signal (e.g. decorr2(E1)) and the third decorrelated signal (e.g. decorr3(E1)) may be generated such that the second reconstructed rotated audio signal $\widehat{E2}$ and the third reconstructed rotated audio signal $\widehat{E3}$ substantially reinstate the correlation of the second rotated audio signal E2 and the third rotated audio signal E3. This may be beneficial for the perceptual quality of the reconstructed soundfield signal. As such, the correlation parameter may be used to improve the perceptual quality of the reconstructed soundfield signal.

The audio encoder may comprise a multi-channel encoding unit configured to waveform encode one or more sub-bands of the plurality of rotated audio signals. Furthermore, the encoder may be configured to provide a start band (which may correspond to a particular sub-band of the plurality of sub-bands). The audio encoder may be configured to encode one or more sub-bands of the plurality of rotated audio signals below the start band (e.g. all the sub-bands below the start band) using the multi-channel encoding unit. In addition, the audio encoder may be configured to encode one or more sub-bands of the plurality of rotated audio signals at or above the start band (e.g. all the sub-bands at or above the start band) using the waveform encoding unit and the parametric encoding unit. In other words, the audio encoder may be configured to perform multi-channel waveform encoding and multi-channel parametric encoding in a frequency selective manner.

The transform determination unit may be configured to quantize the set of transform parameters (e.g. d, ϕ, θ) indicative of the energy-compacting orthogonal transform V. As indicated above, the set of quantized transform parameters may be used by the transform unit to apply the energy-compacting orthogonal transform V. By doing this, it is ensured that the corresponding audio decoder is enabled to apply the corresponding inverse transform (derived based on the set of quantized transform parameters). Furthermore, the transform determination unit may be configured to (Huffman) encode the set of quantized transform parameters and configured to insert the set of quantized and encoded transform parameters into the spatial bit-stream which is to be provided to the corresponding audio decoder. In a similar manner, the parametric encoding unit may be configured to quantize and encode the set (or sets) of spatial parameters and to insert the set of quantized and encoded spatial parameters into the spatial bit-stream. The waveform encoding unit may be configured to encode the first rotated audio signal into a down-mix bit-stream which is to be provided to the corresponding audio decoder. As such, the corresponding audio decoder (which may be located at a corresponding terminal of the teleconferencing system) may be enabled to determine a reconstructed soundfield signal based on the spatial bit-stream and the down-mix bit-stream. Furthermore, a mono audio decoder at a mono terminal of the teleconferencing system may be configured to generate a reconstructed down-mix signal based only on the down-mix bit-stream (without the need to decode the spatial bit-stream). As such, the use of parametric coding and/or the separation of the total bit-stream into a spatial bit-stream and a down-mix bit-stream allows for the implementation of layered teleconferencing systems comprising soundfield terminals and mono terminals.

The audio encoder may be configured to determine a total number of available bits for encoding the frame of the soundfield signal (e.g. in view of an overall bit-rate constraint). Furthermore, the audio encoder may be configured to determine a number of spatial bits used by the spatial bit-stream for the frame of the soundfield signal. In addition, the audio encoder may be configured to determine a number of remaining bits for encoding the first rotated audio signal based on the total number of available bits and based on the number of spatial bits. As a result of the parametric encoding of the others of the plurality of rotated audio signal, the number of remaining bits for encoding the first rotated audio signal is typically higher than the number of bits which is available for encoding the first rotated audio signal in case of a multi-channel waveform encoder. Hence, the perceptual quality of the down-mix signal (i.e. the first rotated audio signal) may be increased, when using parametric encoding (instead of multi-channel encoding).

According to a further aspect, an audio decoder configured to provide or to generate a frame of a reconstructed soundfield signal comprising a plurality of reconstructed audio signals is described. The reconstructed soundfield signal may be generated from a spatial bit-stream and from a down-mix bit-stream received by the audio decoder. The reconstructed soundfield signal may correspond to a soundfield signal in the captured domain (e.g. the LRS domain, thereby enabling the direct rendering using a loudspeaker array of a terminal of the teleconferencing system) or it may correspond to a soundfield signal in the non-adaptive transform domain (e.g. the WXY domain). The reconstructed soundfield signal may correspond to a soundfield signal encoded by a corresponding audio encoder. The spatial bit-stream and the down-mix bit-stream may be indicative of this soundfield signal encoded by the corresponding audio encoder.

The audio decoder may comprise a waveform decoding unit configured to determine a first reconstructed rotated audio signal (e.g. the reconstructed eigen-signal $\widehat{E1}$) of a plurality of reconstructed rotated audio signals (e.g. the eigen-signals $\widehat{E1}$, $\widehat{E2}$, $\widehat{E3}$), from the down-mix bit-stream. The waveform decoding unit may be configured to perform the decoding operations which correspond to the coding operation performed at the waveform encoding unit at the corresponding audio encoder.

The audio decoder may comprise a parametric decoding unit configured to extract a set of spatial parameters (e.g. the parameters ae2, be2) from the spatial bit-stream. Furthermore, the parametric decoding unit may be configured to determine a second reconstructed rotated audio signal (e.g. the reconstructed eigen-signal $\widehat{E2}$) of the plurality of reconstructed rotated audio signals, based on the set of spatial parameters and based on the first reconstructed rotated audio signal.

The set of spatial parameters may comprise a second prediction parameter (e.g. ae2) and the parametric decoding unit may be configured to determine the correlated component of the second reconstructed rotated audio signal by scaling the first reconstructed rotated audio signal with the second prediction parameter (e.g. by multiplying the samples of the first reconstructed rotated audio signal or the samples of the sub-bands of the first reconstructed rotated audio signal with the second prediction parameter ae2). Furthermore, the set of spatial parameters may comprise a second energy adjustment gain (e.g. be2). The parametric decoding unit may be configured to determine a second decorrelated signal (e.g. decorr2($\widehat{E1}$)) based on the first reconstructed rotated audio signal. In particular, the second decorrelated signal may be determined based on a preceding frame of the (current) frame of the first reconstructed rotated audio signal. The parametric decoding unit may be configured to determine the decorrelated component of the second reconstructed rotated audio signal by scaling the second decorrelated signal (e.g. decorr2($\widehat{E1}$)) using the second energy adjustment gain (e.g. be2). In particular, the samples of the second decorrelated signal (or the sub-bands thereof) may be multiplied with the second energy adjustment gain.

Alternatively or in addition to the parametric encoding unit at the audio encoder, the parametric decoding unit may be configured to determine a second indicator of the energy of the second decorrelated signal and a first indicator of the energy of the first reconstructed rotated audio signal. Furthermore, the parametric decoding unit may be configured to modify the second energy adjustment gain based on the first indicator and the second indicator. In particular, the parametric decoding unit may be configured to determine a modified second energy adjustment gain (e.g. $\text{be}\mathbf{2}_{new}$) by reducing the second energy adjustment gain (e.g. be2) in accordance to the ratio of the first indicator and the second indicator, if the second indicator is greater than the first indicator, and/or by maintaining the second energy adjustment gain (i.e. $\text{be}\mathbf{2}_{new}=\text{be}\mathbf{2}$), if the second indicator is smaller than the first indicator.

The parametric decoding unit may then be configured to determine the decorrelated component of the second reconstructed rotated audio signal by scaling the second decorrelated signal with the modified second energy adjustment gain (e.g. $\text{be}\mathbf{2}_{new}$). This may be advantageous with respect to reducing the amount of audible noise comprised within the second reconstructed rotated audio signal (which may be determined based on or as the sum of the correlated component and the decorrelated component of the second reconstructed rotated audio signal).

The audio decoder may further comprise a transform decoding unit which is configured to extract a set of transform parameters (e.g. the parameters d, ϕ, θ) indicative of an energy-compacting orthogonal transform V which has been determined by a corresponding audio encoder, based on a corresponding frame of a soundfield signal which is to be reconstructed (i.e. which corresponds to the reconstructed soundfield signal output by the audio decoder). Furthermore, the audio decoder may comprise an inverse transform unit configured to apply the inverse of the energy-compacting orthogonal transform V to the plurality of reconstructed rotated audio signals (e.g. the signals $\widehat{E1}$, $\widehat{E2}$, $\widehat{E3}$) to yield an inverse transformed soundfield signal. The reconstructed soundfield signal may then be determined based on the inverse transformed soundfield signal (e.g. by applying an inverse of the non-adaptive transform M(g) applied at the audio encoder).

The parametric decoding unit may be configured to extract a plurality of sets of spatial parameters for a plurality of different sub-bands of the plurality of reconstructed rotated audio signals, from the spatial bit-stream. Furthermore, the parametric decoding unit may be configured to determine the second reconstructed rotated audio signal within each of the plurality of sub-bands, based on the respective set of spatial parameters (for that particular sub-band) and based on the first reconstructed rotated audio signal within the respective sub-band. In other words, the parametric decoding unit may be configured to perform parametric decoding on a per sub-band basis. On the other hand, the transform decoding unit may be configured to extract a single set of transform parameters (e.g. d, ϕ, θ) indicative of a single energy-compacting orthogonal transform V for the plurality of sub-bands. Furthermore, the inverse transform unit may be configured to apply the inverse of the single energy-compacting orthogonal transform V to the plurality of sub-bands of the plurality of reconstructed rotated audio signals.

The parametric decoding unit may be configured to determine the second decorrelated signal based on the first reconstructed rotated audio signal in the sub-band domain or in the time domain.

As indicated above, the spatial bit-stream may comprise a correlation parameter (e.g. γ) indicative of a correlation between the second rotated audio signal (e.g. E2) and the third rotated audio signal (e.g. E3) derived (at the corresponding audio encoder, and using the energy-compacting orthogonal transform V) based on the soundfield signal which is to be reconstructed. The parametric decoding unit may be configured to determine the second decorrelated signal (e.g. decorr2($\widehat{E1}$)) for determining the second reconstructed rotated audio signal and a third decorrelated signal (e.g. decorr3($\widehat{E1}$)) for determining the third reconstructed rotated audio signal (e.g. $\widehat{E3}$), based on the first rotated audio signal (e.g. $\widehat{E1}$) and based on the correlation parameter γ. By doing this, it may be ensured that the correlation between the second reconstructed rotated audio signal and the third reconstructed rotated audio signal substantially corresponds to the correlation between the original second rotated audio signal and the third rotated audio signal. This may be beneficial for the perceptual quality of the reconstructed soundfield signal.

Alternatively or in addition, the parametric decoding unit may be configured to determine the second decorrelated signal (e.g. decorr2($\widehat{E1}$)) for determining the second reconstructed rotated audio signal and the third decorrelated signal (e.g. decorr3($\widehat{E1}$)) for determining the third reconstructed rotated audio signal, based on the first rotated audio signal and based on a pre-determined mixing matrix. The pre-determined mixing matrix may be determined based on a training set of second rotated audio signals and third rotated audio signals. In particular, the mixing matrix may be determined based on a training set of correlation parameters (e.g. $\gamma$) indicative of a correlation between the set of second rotated audio signals and third rotated audio signals. By doing this, it may be ensured that the correlation between the second and third decorrelated signals corresponds in average to the correlation between the original second rotated audio signal and the third rotated audio signal (without the need to explicitly transmit a correlation parameter $\gamma$).

The audio decoder may comprise a multi-channel decoding unit configured to determine one or more sub-bands of the plurality of reconstructed rotated audio signals from a bit-stream received from a corresponding multi-channel encoding unit at a corresponding audio encoder. The audio decoder may be configured to provide a start band. Furthermore, the audio decoder may be configured to decode one or more sub-bands of the plurality of reconstructed rotated audio signals below the start band (e.g. all sub-bands) using the multi-channel decoding unit. In addition, the audio decoder may be configured to decode one or more sub-bands of the plurality of reconstructed rotated audio signals at or above the start band (e.g. all sub-bands) using the (single channel) waveform decoding unit and the parametric decoding unit.

According to a further aspect, a method for encoding a frame of a soundfield signal comprising a plurality of audio signals is described. The method may comprise determining an energy-compacting orthogonal transform V based on the frame of the soundfield signal. The method may proceed in applying the energy-compacting orthogonal transform V to a frame derived from the frame of the soundfield signal, thereby providing a frame of a rotated soundfield signal comprising a plurality of rotated audio signals (which corresponds to the frame of the soundfield signal). The method may further comprise encoding a first rotated audio signal of the plurality of rotated audio signals using waveform encoding. Furthermore, the method may comprise determining a set of spatial parameters enabling the generation of a second rotated audio signal of the plurality of rotated audio signals based on the first rotated audio signal (and based on the set of spatial parameters).

In one embodiment of the invention the energy-compacting orthogonal transform (V) comprises a non-adaptive downmixing transform. Preferably the non-adaptive downmixing transform comprises a transform of a higher order audio signal to a lower order audio signal. Ideally the higher order audio signal comprises a three microphone array signal. Most preferably the lower order audio signal comprises a two-dimensional format signal.

In another embodiment the energy-compacting orthogonal transform (V) comprises an adaptive downmixing transform. Preferably the energy-compacting orthogonal transform (V) comprises the non-adaptive downmixing transform and the adaptive downmixing transform, the adaptive downmixing transform being performed after the non-adaptive downmixing transform. Ideally the adaptive downmixing transform comprises a Karhunen-Loève transform (KLT).

According to another aspect, a method for decoding a frame of a reconstructed soundfield signal comprising a plurality of reconstructed audio signals, from a spatial bit-stream and from a down-mix bit-stream, is described. The method may comprise determining from the down-mix bit-stream a first reconstructed rotated audio signal of a plurality of reconstructed rotated audio signals (e.g. using waveform decoding). In addition, the method may comprise extracting a set of spatial parameters from the spatial bit-stream. The method may proceed in determining a second reconstructed rotated audio signal of the plurality of reconstructed rotated audio signals, based on the set of spatial parameters and based on the first reconstructed rotated audio signal. Furthermore, the method may comprise extracting a set of transform parameters indicative of an energy-compacting orthogonal transform V which has been determined based on a corresponding frame of the soundfield signal which is to be reconstructed. The inverse of the energy-compacting orthogonal transform V may be applied to the plurality of reconstructed rotated audio signals to yield an inverse transformed soundfield signal. The reconstructed soundfield signal may be determined based on the inverse transformed soundfield signal.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

Figure 2A:
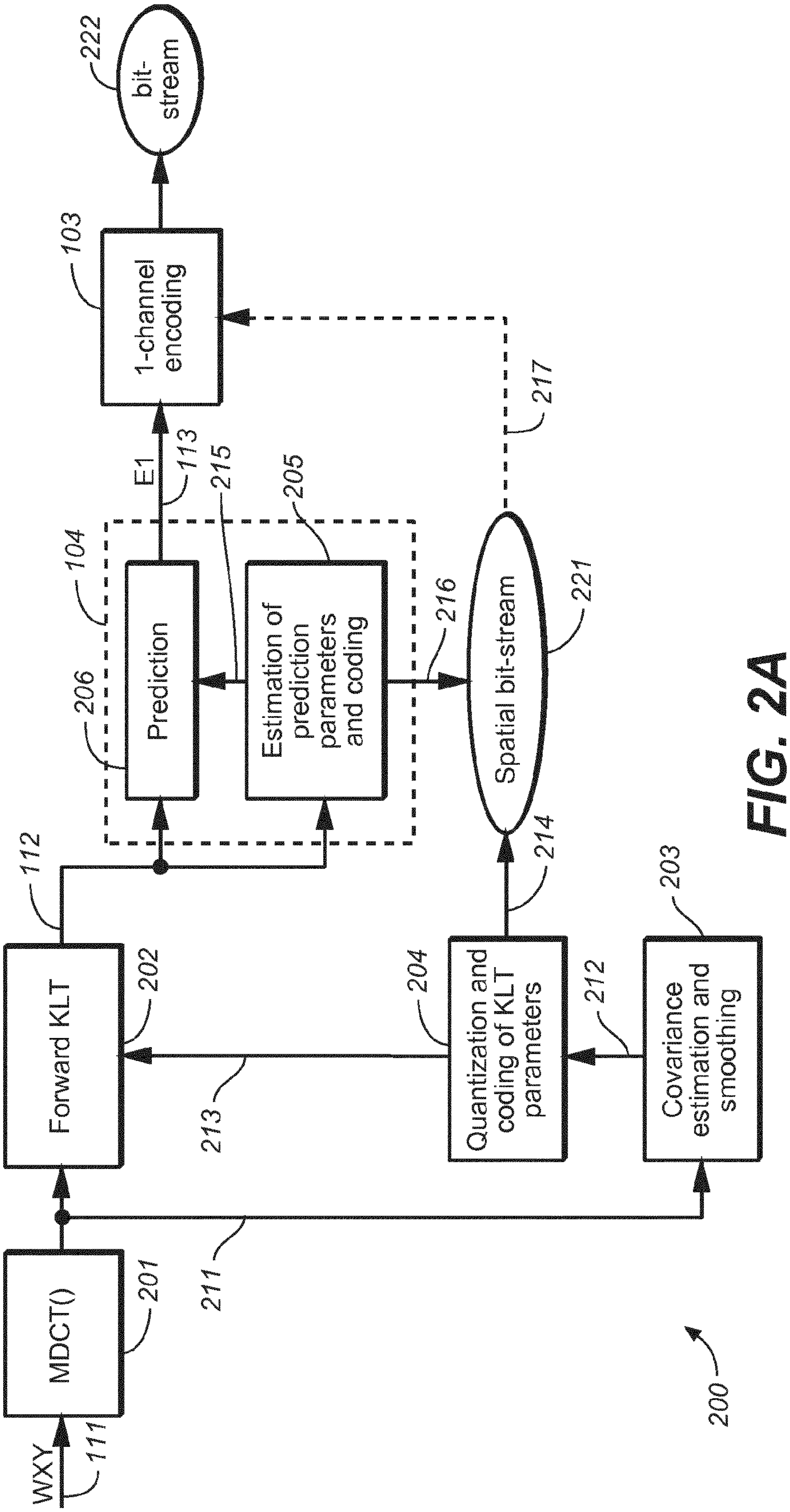
Figure 2B:
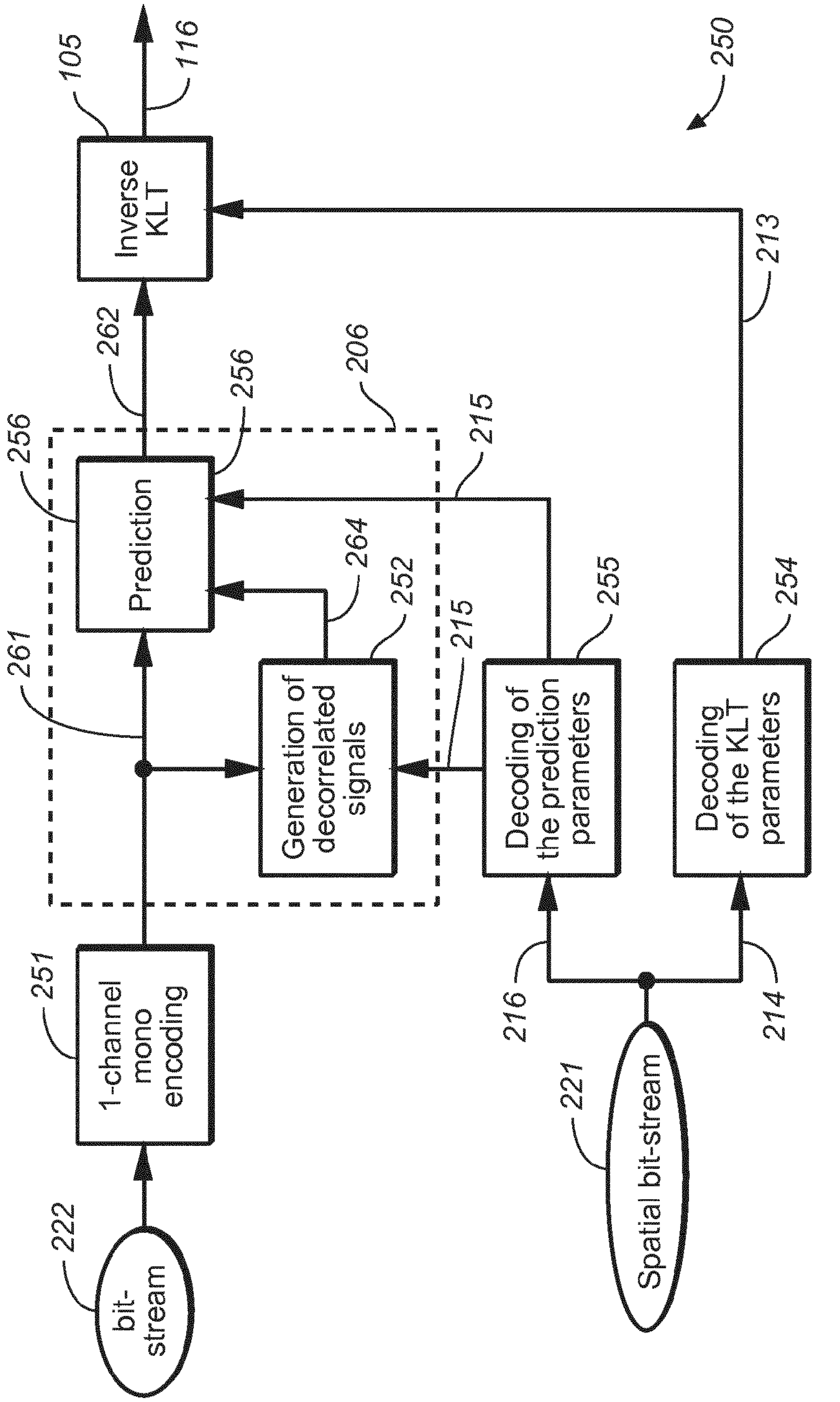
Figure 3A:
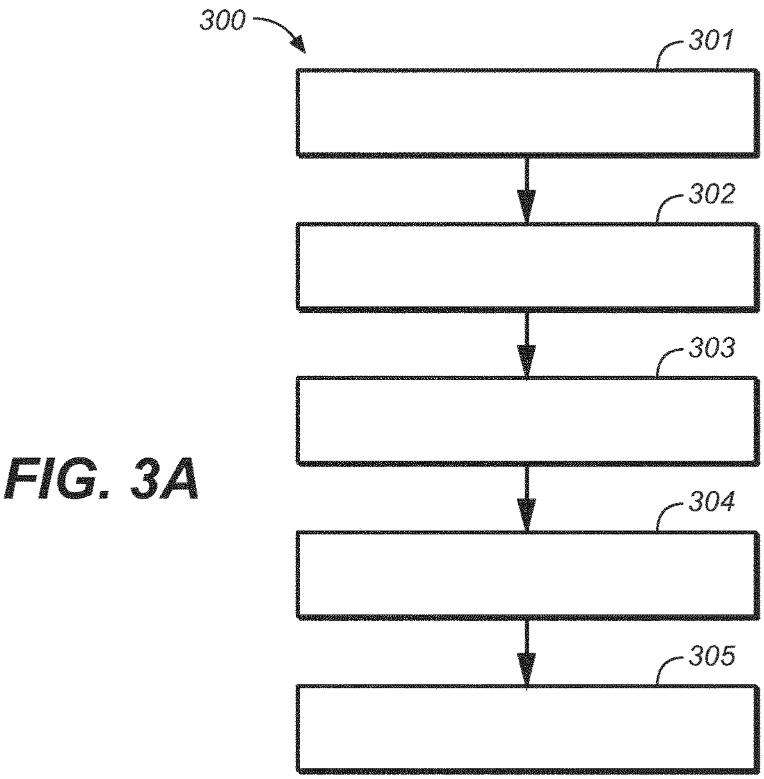
Figure 3B:
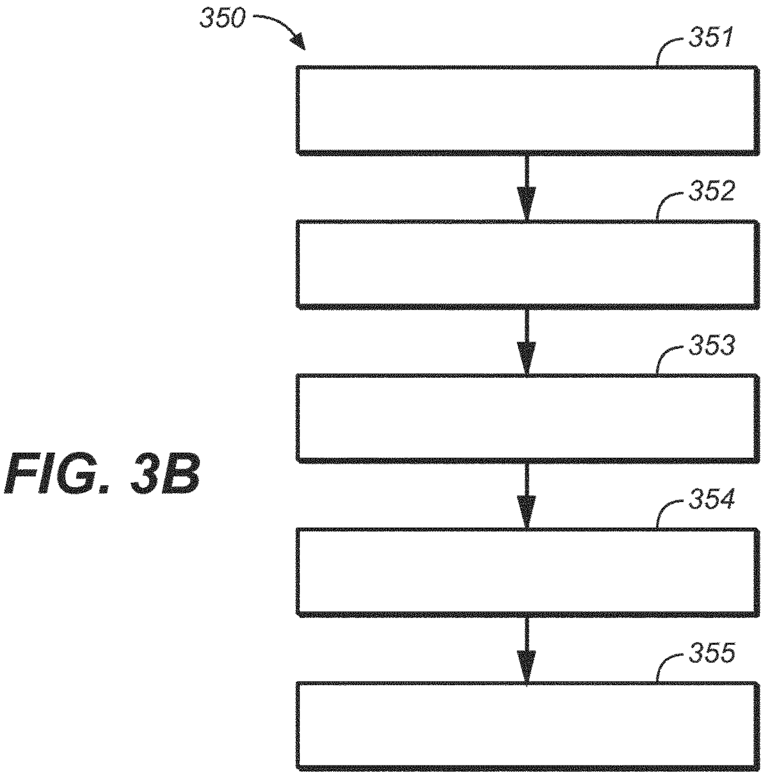

The invention is explained below in an exemplary manner with reference to the accompanying drawings, wherein FIG. 1 shows a block diagram of an example soundfield coding system;

FIG. 2*a* shows a block diagram of an example soundfield encoder;

FIG. 2*b* shows a block diagram of an example soundfield decoder;

FIG. 3*a* shows a flow chart of an example method for encoding a soundfield signal; and FIG. 3*b* shows a flow chart of an example method for decoding a soundfield signal.

DETAILED DESCRIPTION

Two-dimensional spatial soundfields are typically captured by a 3-microphone array ("LRS") and then represented in the 2-dimensional B format ("WXY"). The 2-dimensional B format ("WXY") is an example of a soundfield signal, in particular an example of a 3-channel soundfield signal. A 2-dimensional B format typically represents soundfields in the X and Y directions, but does not represent soundfields in a Z direction (elevation). Such 3-channel spatial soundfield signals may be encoded using a discrete and a parametric approach. The discrete approach has been found to be efficient at relatively high operating bit-rates, while the parametric approach has been found to be efficient at relatively low rates (e.g. at 24 kbit/s or less per channel). In the present document a coding system is described which uses a parametric approach.

The parametric approaches have an additional advantage with respect to a layered transmission of soundfield signals. The parametric coding approach typically involves the generation of a down-mix signal and the generation of spatial parameters which describe one or more spatial signals. The parametric description of the spatial signals, in general, requires a lower bit-rate than the bit-rate required in a discrete coding scenario. Therefore, given a pre-determined bit-rate constraint, in the case of parametric approaches, more bits can be spent for discrete coding of a down-mix signal from which a soundfield signal may be reconstructed using the set of spatial parameters. Hence, the down-mix signal may be encoded at a bit-rate which is higher than the bit-rate used for encoding each channel of a soundfield signal separately. Consequently, the down-mix signal may be provided with an increased perceptual quality. This feature of the parametric coding of spatial signals is useful in applications involving layered coding, where mono clients (or terminals) and spatial clients (or terminals) coexist in a teleconferencing system. For example, in case of a mono client, the down-mix signal may be used for rendering a mono output (ignoring the spatial parameters which are used to reconstruct the complete soundfield signal). In other words, a bit-stream for a mono client may be obtained by stripping off the bits from the complete soundfield bit-stream which are related to the spatial parameters.

The idea behind the parametric approach is to send a mono down-mix signal plus a set of spatial parameters that allow reconstructing a perceptually appropriate approximation of the (3-channel) soundfield signal at the decoder. The down-mix signal may be derived from the to-be-encoded soundfield signal using a non-adaptive down-mixing approach and/or an adaptive down-mixing approach.

The non-adaptive methods for deriving the down-mix signal may comprise the usage of a fixed invertible transformation. An example of such a transformation is a matrix that converts the "LRS" representation into the 2-dimensional B format ("WXY"). In this case, the component W may be a reasonable choice for the down-mix signal due to the physical properties of the component W. It may be assumed that the "LRS" representation of the soundfield signal was captured by an array of 3 microphones, each having a cardioid polar pattern. In such a case, the W component of the B-format representation is equivalent to a signal captured by a (virtual) omnidirectional microphone. The virtual omnidirectional microphone provides a signal that is substantially insensitive to the spatial position of the sound source, thus it provides a robust and stable down-mix signal. For example, the angular position of the primary sound source which is represented by the soundfield signal does not affect the W component. The transformation to the B-format is invertible and the "LRS" representation of the soundfield can be reconstructed, given "W" and the two other components, namely "X" and "Y". Therefore, the (parametric) coding may be performed in the "WXY" domain. It should be noted that in more general term the above mentioned "LRS" domain may be referred to as the captured domain, i.e. the domain within which the soundfield signal has been captured (using a microphone array).

An advantage of parametric coding with a non-adaptive down-mix is due to the fact that such a non-adaptive approach provides a robust basis for prediction algorithms performed in the "WXY" domain because of the stability and robustness of the down-mix signal. A possible disadvantage of parametric coding with a non-adaptive down-mix is that the non-adaptive down-mix is typically noisy and carries a lot of reverberation. Thus, prediction algorithms which are performed in the "WXY" domain may have a reduced performance, because the "W" signal typically has different characteristics than the "X" and "Y" signals.

The adaptive approach to creating a down-mix signal may comprise performing an adaptive transformation of the "LRS" representation of the soundfield signal. An example for such a transformation is the Karhunen-Loève transform (KLT). The transformation is derived by performing the eigenvalue decomposition of the inter-channel covariance matrix of the soundfield signal. In the discussed case, the inter-channel covariance matrix in the "LRS" domain may be used. The adaptive transformation may then be used to transform the "LRS" representation of the signal into the set of eigen-channels, which may be denoted by "E1 E2 E3". High coding gains may be achieved by applying coding to the "E1 E2 E3" representation. In the case of a parametric coding approach, the "E1" component could serve as the mono-down-mix signal.

An advantage of such an adaptive down-mixing scheme is that the eigen-domain is convenient for coding. In principle, an optimal rate-distortion trade-off can be achieved when encoding the eigen-channels (or eigen-signals). In the idealistic case, the eigen-channels are fully decorrelated and they can be coded independently from one another with no performance loss (compared to a joint coding). In addition, the signal E1 is typically less noisy than the "W" signal and typically contains less reverberation. However, the adaptive down-mixing strategy has also disadvantages. A first disadvantage is related to the fact that the adaptive down-mixing transformation must be known by the encoder and by the decoder, and, therefore, parameters which are indicative of the adaptive down-mixing transformation must be coded and transmitted. In order to achieve the goal with respect to decorrelation of the eigen-signals E1, E2 and E3, the adaptive transformation should be updated at a relatively high frequency. The regular update of the adaptive transmission leads to an increase in computational complexity and requires a bit-rate to transmit a description of the transformation to the decoder.

A second disadvantage of the parametric coding based on the adaptive approach may be due to instabilities of the E1-based down-mix signal. The instabilities may be due to the fact that the underlying transformation that provides the down-mix signal E1 is signal-adaptive and therefore the transformation is time varying. The variation of the KLT typically depends on the spatial properties of the signal sources. As such, some types of input signals may be particularly challenging, such as multiple talkers scenarios, where multiply talkers are represented by the soundfield signal. Another source of instabilities of the adaptive approach may be due to the spatial characteristic of the microphones that are used to capture the "LRS" representation of the soundfield signal. Typically, directive microphone arrays having polar patterns (e.g., cardioids) are used to capture the soundfield signals. In such cases, the inter-channel covariance matrix of the soundfield signal in the "LRS" representation may be highly variable, when the spatial properties of the signal source change (e.g., in a multiple talkers scenario) and so would be the resulting KLT.

In the present document, a down-mixing approach is described, which addresses the above mentioned stability issues of the adaptive down-mixing approach. The described down-mixing scheme combines the advantages of the non-adaptive and the adaptive down-mixing methods. In particular, is it proposed to determine an adaptive down-mix signal, e.g. a "beamformed" signal that contains primarily the dominating component of the soundfield signal and that maintains the stability of the down-mixing signal derived using a non-adaptive down-mixing method.

It should be noted that the transformation from the "LRS" representation to the "WXY" representation is invertible, but it is non-orthonormal. Therefore, in the context of coding (e.g. due to quantization), application of the KLT in the "LRS" domain and application of KLT in the "WXY" domain are usually not equivalent. An advantage of the WXY representation relates to the fact that it contains the component "W" which is robust from the point of view of the spatial properties of the sound source. In the "LRS" representation all the components are typically equally sensitive to the spatial variability of the sound source. On the other hand, the "W" component of the WXY representation is typically independent of the angular position of the primary sound source within the soundfield signal.

It can further be stated that regardless the representation of the soundfield signals, it is beneficial to apply the KLT in a transformed domain, where at least one component of the soundfield signal is spatially stable. As such, it may be beneficial to transform a soundfield representation to a domain, where at least one component of the soundfield signal is spatially stable. Subsequently, an adaptive transformation (such as the KLT) may be used in the domain, where at least one component signal is spatially stable. In other words, the usage of a non-adaptive transformation that depends only on the properties of the polar patterns of the microphones of the microphone array which is used to capture the soundfield array is combined with an adaptive transformation that depends on the inter-channel time-varying covariance matrix of the soundfield signal in the non-adaptive transform domain. We note that both transformations (i.e. the non-adaptive and the adaptive transformation) are invertible. In other words, the benefit of the proposed combination of the two transforms is that the two transforms are both guaranteed to be invertible in any case, and, therefore the two transforms allow for an efficient coding of the soundfield signal.

As such, it is proposed to transform a captured soundfield signal from the captured domain (e.g. the "LRS" domain) to a non-adaptive transform domain (e.g. the "WXY" domain). Subsequently, an adaptive transform (e.g. a KLT) may be determined based on the soundfield signal in the non-adaptive transform domain. The soundfield signal may be transformed into the adaptive transform domain (e.g. the "E1E2E3" domain) using the adaptive transform (e.g. the KLT).

In the following, different parametric coding schemes are described. The coding schemes may use a prediction-based and/or a KLT-based parameterizations. The parametric coding schemes are combined with the above mentioned down-mixing schemes, aiming at improving the overall rate-quality trade-off of the codec.

FIG. 1 shows a block diagram of an example coding system 100. The illustrated system 100 comprises components 120 which are typically comprised within an encoder of the coding system 100 and components 130 which are typically comprised within a decoder of the coding system 100. The coding system 100 comprises an (invertible and/or non-adaptive) transformation 101 from the "LRS" domain to the "WXY" domain, followed by an energy concentrating orthonormal (adaptive) transformation (e.g. the KLT transform) 102. The soundfield signal 110 in the domain of the capturing microphone array (e.g. the "LRS" domain) is transformed by the non-adaptive transform 101 into a soundfield signal 111 in a domain which comprises a stable down-mix signal (e.g. the signal "W" in the "WXY" domain). Subsequently, the soundfield signal 111 is transformed using the decorrelating transform 102 into a soundfield signal 112 comprising decorrelated channels or signals (e.g. the channels E1, E2, E3).

The first eigen-channel E1 113 may be used to encode parametrically the other eigen-channels E2 and E3. The down-mix signal E1 may be coded using a single-channel audio and/or speech coding scheme using the down-mix coding unit 103. The decoded down-mix signal 114 (which is also available at the corresponding decoder) may be used to parametrically encode the eigen-channels E2 and E3. The parametric encoding may be performed in the parametric coding unit 104. The parametric coding unit 104 may provide a set of spatial parameters which may be used to reconstruct the signals E2 and E3 from the decoded signal E1 114. The reconstruction is typically performed at the corresponding decoder. Furthermore, the decoding operation comprises usage of the reconstructed E1 signal and the parametrically decoded E2 and E3 signals (reference numeral 115) and comprises performing an inverse orthonormal transformation (e.g. an inverse KLT) 105 to yield a reconstructed soundfield signal 116 in the non-adaptive transform domain (e.g. the "WXY" domain). The inverse orthonormal transformation 105 is followed by a transformation 106 (e.g. the inverse non-adaptive transform) to yield the reconstructed soundfield signal 117 in the captured domain (e.g. the "LRS" domain). The transformation 106 typically corresponds to the inverse transformation of the transformation 101. The reconstructed soundfield signal 117 may be rendered by a terminal of the teleconferencing system, which is configured to render soundfield signals. A mono terminal of the teleconferencing system may directly render the reconstructed down-mix signal E1 114 (without the need of reconstructing the soundfield signal 117).

In order to achieve an increased coding quality, it is beneficial to apply parametric coding in a sub-band domain. A time domain signal can be transformed to the sub-band domain by means of a time-to-frequency (T-F) transformation, e.g. an overlapped T-F transformation such as, for example, MDCT (Modified Discrete Cosine Transform). Since the transformations 101, 102 are linear, the T-F transformation, in principle, can be equivalently applied in the captured domain (e.g. the "LRS" domain), in the non-adaptive transform domain (e.g. the "WXY" domain) or in the adaptive transform domain (e.g. the "E1 E2 E3"

domain). As such, the encoder may comprise a unit configured to perform a T-F transformation (e.g. unit 201 in FIG. 2*a*).

The description of a frame of the 3-channel soundfield signal 110 that is generated using the coding system 100 comprises e.g. two components. One component comprises parameters that are adapted at least on a per-frame basis. The other component comprises a description of a monophonic waveform that is obtained based on the down-mix signal 113 (e.g. E1) by using a 1-channel mono coder (e.g. a transform based audio and/or speech coder).

The decoding operation comprises decoding of the 1-channel mono down-mix signal (e.g. the E1 down-mix signal). The reconstructed down-mix signal 114 is then used to reconstruct the remaining channels (e.g. the E2 and E3 signals) by means of the parameters of the parameterization (e.g. by means of prediction parameters and/or by means of energy adjustment gain parameters). Subsequently, the reconstructed eigen-signals E1 E2 and E3 115 are rotated back to the non-adaptive transform domain (e.g. the "WXY" domain) by using transmitted parameters which describe the decorrelating transformation 102 (e.g. by using the KLT parameters). The reconstructed soundfield signal 117 in the captured domain may be obtained by transforming the "WXY" signal 116 to the original "LRS" domain.

FIGS. 2*b* and 2*c* show block diagrams of an example encoder 200 and of an example decoder 250, respectively, in more detail. In the illustrated example, the encoder 200 comprises a T-F transformation unit 201 which is configured to transform the (channels of the) soundfield signal 111 within the non-adaptive transform domain into the frequency domain, thereby yielding sub-band signals 211 for the soundfield signal 111. As such, in the illustrated example, the transformation 202 of the soundfield signal 111 into the adaptive transform domain is performed on the different sub-band signals 211 of the soundfield signal 111.

In the following, the different components of the encoder 200 and of the decoder 250 are described.

As outlined above, the encoder 200 may comprise a first transformation unit 101 configured to transform the soundfield signal 110 from the captured domain (e.g. the "LRS" domain) into a soundfield signal 111 in the non-adaptive transform domain (e.g. the "WXY" domain). A transformation from the "LRS" domain to the "WXY" domain may be performed by the transformation $[W\ X\ Y]^T = M(g)\ [L\ R\ S]^T$, with the transform matrix M(g) given by $$M(g) = \frac{1}{3}\begin{bmatrix} 2g & 2g & 2g \\ 2 & 2 & -4 \\ 2\sqrt{3} & -2\sqrt{3} & 0 \end{bmatrix},$$

where g>0 is a finite constant. If g=1, a proper "WXY" representation is obtained (i.e., according to the definition of the 2-dimensional B-format), however other values g may be considered.

The KLT 102 provides rate-distortion efficiency if it can be adapted often enough with respect to the time varying statistical properties of the signals it is applied to. However, frequent adaptation of the KLT may introduce coding artifacts that degrade the perceptual quality. It has been determined experimentally that a good balance between rate-distortion efficiency and the introduced artifacts is obtained by applying the KLT transform to the soundfield signal 111 in the "WXY" domain instead of applying the KLT transform to the soundfield signal 110 in the "LRS" domain (as already outlined above).

The parameter g of the transform matrix M(g) may be useful in the context of stabilizing the KLT. As outlined above, it is desirable for the KLT to be substantially stable. By selecting g≠sqrt(2), the transform matrix M(g) is not be orthogonal and the W component is emphasized (if g>sqrt(2)) or deemphasized (if g<sqrt(2)). This may have a stabilizing effect on the KLT. It should be noted that for any g≠0 the transform matrix M(g) is always invertible, thus facilitating coding (due to the fact that the inverse matrix $M^{-1}(g)$ exists and can be used at the decoder 250). However, if g≠sqrt(2) the coding efficiency (in terms of the rate-distortion trade-off) typically decreases (due to the non-orthogonality of the transform matrix M(g)). Therefore, the parameter g should be selected to provide an improved trade-off between the coding efficiency and the stability of the KLT. In the course of experiments, it was determined that g=1 (and thus a "proper" transformation to the "WXY" domain) provides a reasonable trade-off between the coding efficiency and the stability of the KLT.

In the next step, the soundfield signals 111 in the "WXY" domain are analysed. First, the inter-channel covariance matrix may be estimated using a covariance estimation unit 203. The estimation may be performed in the sub-band domain (as illustrated in FIG. 2*a*). The covariance estimator 203 may comprise a smoothing procedure that aims at improving estimation of the inter-channel covariance and at reducing (e g minimizing) possible problems caused by substantial time variability of the estimate. As such, the covariance estimation unit 203 may be configured to perform a smoothing of the covariance matrix of a frame of the soundfield signal 111 along the time line.

Furthermore, the covariance estimation unit 203 may be configured to decompose the inter-channel covariance matrix by means of an eigenvalue decomposition (EVD) yielding an orthonormal transformation V that diagonalizes the covariance matrix. The transformation V facilitates rotation of the "WXY" channels into an eigen-domain comprising the eigen-channels "E1 E2 E3" according to $$\begin{bmatrix} E1 \\ E2 \\ E3 \end{bmatrix} = V \begin{bmatrix} W \\ X \\ Y \end{bmatrix}.$$

Since the transformation V is signal adaptive and it is inverted at the decoder 250, the transformation V needs to be efficiently coded. In order to code the transformation V the following parameterization is proposed:

$$V(d, \varphi, \theta) = \left[\begin{bmatrix} c(1-d) & 0 & cd \\ cd\cos\varphi & -\sin\varphi & -c(1-d)\cos\varphi \\ cd\sin\varphi & \cos\varphi & -c(1-d)\sin\varphi \end{bmatrix}\begin{bmatrix} 1 & 0 & 0 \\ 0 & \cos\theta & -\sin\theta \\ 0 & \sin\theta & \cos\theta \end{bmatrix}\right]^T,$$

wherein $c = 1/\sqrt{(1-d)^2 + d^2}$ and the parameters d, ϕ, θ specify the transformation. It is noted that the proposed parameterization imposes a constraint on the sign of the (1,1) element of the transformation V (i.e. the (1,1) element always needs to be positive). It is advantageous to introduce such a constraint and it can be shown that such a constraint does not result in any performance loss (in terms of achieved coding gain). The transformation V(d, ϕ, θ) which is described by the parameters d, ϕ, θ is used within the transform unit 202 at the encoder 200 and within the corresponding inverse transform unit 105 at the decoder 250. Typically, the parameters d, ϕ, θ are provided by the covariance estimation unit 203 to a transform parameter coding unit 204 which is configured to quantize and (Huffman) encode the transform parameters d, ϕ, θ 212. The encoded transform parameters 214 may be inserted into a spatial bit-stream 221. A decoded version of the encoded transform parameters 213 (which corresponds to the decoded transform parameters 213 $\hat{d}$, $\hat{\phi}$, $\hat{\theta}$ at the decoder 250) is provided to the decorrelation unit 202, which is configured to perform the transformation:

$$\begin{bmatrix} E1 \\ E2 \\ E3 \end{bmatrix} = V(\hat{d}, \hat{\varphi}, \hat{\theta}) \begin{bmatrix} W \\ X \\ Y \end{bmatrix}.$$

As a result, the soundfield signal 112 in the decorrelated or eigenvalue or adaptive transform domain is obtained.

In principle, the transformation V($\hat{d}$,$\hat{\phi}$,$\hat{\theta}$) could be applied on a per sub-band basis to provide a parametric coder of the soundfield signal 110. The first eigen-signal E1 contains by definition the most energy, and the eigen-signal E1 may be used as the down-mix signal 113 that is transform coded using a mono encoder 103. An additional benefit of coding the E1 signal 113 is that a similar quantization error is spread among all three channels of the soundfield signal 117 at the decoder 250 when transforming back to the captured domain from the KLT domain. This reduces potential spatial quantization noise unmasking effects.

Parametric coding in the KLT domain may be performed as follows. One can apply waveform coding to the eigen-signal E1 (single a mono encoder 103). Furthermore, parametric coding may be applied to the eigen-signals E2 and E3. In particular, two decorrelated signals may be generated from the eigen-signal E1 using a decorrelation method (e.g. by using delayed version of the eigen-signal E1). The energy of the decorrelated versions of the eigen-signal E1 may be adjusted, such that the energy matches the energy of the corresponding eigen-signals E2 and E3, respectively. As a result of the energy adjustment, energy adjustment gains be2 (for the eigen-signal E2) and be3 (for the eigen-signal E3) may be obtained. These energy adjustment gains may be determined as outlined below. The energy adjustment gains be2 and be3 may be determined in a parameter estimation unit 205. The parameter estimation unit 205 may be configured to quantize and (Huffman) encode the energy adjustment gains to yield the encoded gains 216 which may be inserted into the spatial bit-stream 221. The decoded version of the encoded gains 216 (i.e. the decoded gains $\widehat{be2}$ and $\widehat{be3}$ 215) may be used at the decoder 250 to determine reconstructed eigen-signals $\widehat{E2}$, $\widehat{E3}$ from the reconstructed eigen-signal $\widehat{E1}$. As already outlined above, the parametric coding is typically performed on a per sub-band basis, i.e. energy adjustment gains be2 (for the eigen-signal E2) and be3 (for the eigen-signal E3) are typically determined for a plurality of sub-bands.

It should be noted that the application of the KLT on a per sub-band basis is relatively expensive in terms of the number of parameters $\hat{d}$, $\hat{\phi}$, $\hat{\theta}$ 214 that are required to be determined and encoded. For example, to describe a sub-band of a soundfield signal 112 in the "E1 E2 E3" domain three (3) parameters are used to describe the KLT, namely d, ϕ, θ and in addition two gain adjustment parameters be2 and be3 are used. Therefore the total number of parameters is five (5) parameters per sub-band. In the case, where there are more channels describing the soundfield signal, the KLT-based coding would require a significantly increased number of transformation parameters to describe the KLT. For example, a minimum number of transform parameters needed to specify a KLT in a 4 dimensional space is 6. In addition, 3 adjustment gain parameters would be used to determine the eigen-signals E2, E3 and E4 from the eigen-signal E1. Therefore, the total number of parameters would be 9 per sub-band. In a general case, having a soundfield signal comprising M channels, $O(M^2)$ parameters are required to describe the KLT transform parameters and O(M) parameters are required to describe the energy adjustment which is performed on the eigen-signals. Hence, the determination of a set of transform parameters 212 (to describe the KLT) for each sub-band may require the encoding of a significant number of parameters.

In the present document an efficient parametric coding scheme is described, where the number of parameters used to code the soundfield signals is always O(M) (notably, as long as the number of sub-bands N is substantially larger than the number of channels M). In particular, in the present document, it is proposed to determine the KLT transform parameters 212 for a plurality of sub-bands (e.g. for all of the sub-bands or for all of the sub-bands comprising frequencies which are higher than the frequencies comprised within a start-band). Such a KLT which is determined based on and applied to a plurality of sub-bands may be referred to as a broadband KLT. The broadband KLT only provides completely decorrelated eigen-vectors E1, E2, E3 for the combined signal corresponding to the plurality of sub-bands, based on which the broadband KLT has been determined. On the other hand, if the broadband KLT is applied to an individual sub-band, the eigen-vectors of this individual sub-band are typically not fully decorrelated. In other words, the broadband KLT generates mutually decorrelated eigen-signals only as long as full-band versions of the eigen-signals are considered. However, it turns out that there remains a significant amount of correlation (redundancy) that exists on a per sub-band basis. This correlation (redundancy) among the eigen-vectors E1, E2, E3 on a per sub-band basis can be efficiently exploited by a prediction scheme. Therefore, a prediction scheme may be applied in order to predict the eigen-vectors E2 and E3 based on the primary eigen-vector E1. As such, it is proposed to apply predictive coding to the eigen-channel representation of the soundfield signals obtained by means of a broadband KLT performed on the soundfield signal 111 in the "WXY" domain.

The prediction based coding scheme may provide a parameterization which divides the parameterized signals E2, E3 into a fully correlated (predicted) component and into a decorrelated (non-predicted) component derived from the down-mix signal E1. The parameterization may be performed in the frequency domain after an appropriate T-F transform 201. Certain frequency bins of a transformed time frame of the soundfield signal 111 may be combined to form frequency bands that are processed together as single vectors (i.e. sub-band signals). Usually, this frequency banding is perceptually motivated. The banding of the frequency bins may lead to only one or two frequency bands for a whole frequency range of the soundfield signal.

More specifically, in each time frame (of e.g. 20 ms) and for each frequency band, the eigen-vector E1(*t*,*f*) may be used as the down-mix signal 113, and eigen-vectors E2$(t,f)$ and E3$(t,f)$ may be reconstructed as $$E2(t,f)=ae2(t,f)*E1(t,f)+be2(t,f)*\text{decorr2}(E1(t,f)), \quad (1)$$

$$E3(t,f)=ae3(t,f)*E1(t,f)+be3(t,f)*\text{decorr3}(E1(0)), \quad (2)$$

with ae2, be2, ae3, be3 being parameters of the parameterization and with decorr2( ) and decorr3( ) being two different decorrelators. Instead of E1$(t,f)$ 113, a reconstructed version $\widehat{E1}(t,f)$ 261 of the down-mix signal E1$(t,f)$ 113 (which is also available at the decoder 250) may be used in the above formulas.

At the encoder 200 (within unit 104 and in particular within unit 205), the prediction parameters ae2 and ae3 may be calculated as MSE (mean square error) estimators between the down-mix E1, and E2 and E3, respectively. For example, in a real-valued MDCT domain, the prediction parameters ae2 and ae3 may be determined as (possibly using $\widehat{E1}(t,f)$ instead of E1$(t,f)$):

$$ae2(t,f)=(E1^T(t,f)*E2(t,f))/(E1^T(t,f)*E1(t,f)), \quad (3)$$

$$ae3(t,f)=(E1^T(t,f)*E3(t,f))/(E1^T(t,f)*E1(t,f)), \quad (4)$$

where $^T$ indicates a vector transposition. As such, the predicted component of the eigen-signals E2 and E3 may be determined using the prediction parameters ae2 and ae3.

The determination of the decorrelated component of the eigen-signals E2 and E3 makes use of the determination of two uncorrelated versions of the down-mix signal E1 using the decorrelators decorr2( ) and decorr3( ). Typically, the quality (performance) of the decorrelated signals decorr2(E1$(t,f)$) and decorr3(E1$(t,f)$) has an impact on the overall perceptual quality of the proposed coding scheme. Different decorrelation methods may be used. By way of example, a frame of the down-mix signal E1 may be all-pass filtered to yield corresponding frames of the decorrelated signals decorr2(E1$(t,f)$) and decorr3(E1$(t,f)$). In the coding of 3-channel soundfield signals, it turns out that perceptually stable results may be achieved by using as the decorrelated signals delayed versions (i.e. stored previous frames) of the down-mix signal E1 (or of the reconstructed down-mix signal $\widehat{E1}$, e.g. $\widehat{E1}$(t−1,f) and $\widehat{E1}$(t−2,f).

If the decorrelated signals are replaced by mono-coded residual signals, the resulting system achieves again waveform coding, which may be advantageous if the prediction gains are high. For example, one may consider to explicitly determine the residual signals resE2$(t,f)$=E2$(t,f)$−ae2$(t,f)$*E1$(t,f)$), and resE3$(t,f)$=E3$(t,f)$−ae3$(t,f)$*E1$(t,f)$), which have the properties of decorrelated signals (at least from the point of view of the assumed model, given by equations (1) and (2)). Waveform coding of these signals resE2$(t,f)$ and resE3$(t,f)$ may be considered as an alternative to the usage of synthetic decorrelated signals. Further instances of the mono codec may be used to perform explicit coding of the residual signals resE2$(t,f)$ and resE3$(t,f)$. This would be disadvantageous, however, as the bit-rate required for conveying the residuals to the decoder would be relatively high. On the other hand, an advantage of such an approach is that it facilitates decoder reconstruction that approaches perfect reconstruction as the allocated bit-rate becomes large.

The energy adjustment gains be2$(t,f)$ and be3$(t,f)$ for the decorrelators may be computed as $$be2(t,f)=\text{norm}(E2(t,f)-ae2(t,f)*E1(t,f))/\text{norm}(E1(t,f)) \quad (5)$$

$$be3(t,f)=\text{norm}(E3(t,f)-ae3(t,f)*E1(t,f))/\text{norm}(E1(t,f)), \quad (6)$$

where norm( ) indicates the RMS (root mean squared) operation. The down-mix signal E1 $(t,f)$ may be replaced by the reconstructed down-mix signal $\widehat{E1}(t,f)$ in the above formula. Using this parameterization, the variances of the two prediction error signals are reinstated at the decoder 250.

It should be noted that the signal model given by the equations (1) and (2) and the estimation procedure to determine the energy adjustment gains be2$(t,f)$ and be3$(t,f)$ given by equations (5) and (6) assume that the energy of the decorrelated signals decorr2(E1$(t,f)$) and decorr3(E1$(t,f)$) matches (at least approximately) the energy of the down-mix signal E1$(t,f)$. Depending on the decorrelators used, this may not be the case (e.g. when using the delayed versions of E1$(t,f)$, the energy of E1$(t-1,f)$ and E1$(t-2,f)$ may differ from the energy of E1$(t,f)$). In addition, the decoder 250 has only access to a decoded version $\widehat{E1}(t,f)$ of E1$(t,f)$, which, in principle, can have a different energy than the uncoded down-mix signal E1$(t,f)$.

In view of the above, the encoder 200 and/or the decoder 250 may be configured to adjust the energy of the decorrelated signals decorr2(E1$(t,f)$) and decorr3(E1$(t,f)$) or to further adjust the energy adjustment gains be2$(t,f)$ and be3$(t,f)$ in order to take into account the mismatch between the energy of the decorrelated signals decorr2(E1$(t,f)$) and decorr3(E2$(t,f)$) and the energy of E1$(t,f)$ (or $\widehat{E1}(t,f)$). As outlined above, the decorrelators decorr2( ) and decorr3( ) may be implemented as a one frame delay and a two frame delay, respectively. In this case, the aforementioned energy mismatch typically occurs (notably in case of signal transients). In order to ensure the correctness of the signal model given by formulas (1) and (2) and in order to insert an appropriate amount of the decorrelated signals decorr2(E1$(t,f)$) and decorr3(E1$(t,f)$) during reconstruction, further energy adjustments should be performed (at the encoder 200 and/or at the decoder 250).

In an example, the further energy adjustment may operate as follows. The encoder 200 may have inserted (quantized and encoded versions of) the energy adjustments gains be2$(t,f)$ and be3$(t,f)$ (determined using formulas (5) and (6)) into the spatial bit-stream 221. The decoder 250 may be configured to decode the energy adjustment gains be2$(t,f)$ and be3$(t,f)$ (in prediction parameter decoding unit 255), to yield the decoded adjustment gains $\widehat{be2}(t,f)$ and $\widehat{be3}(t,f)$ 215. Furthermore, the decoder 250 may be configured to decode the encoded version of the down-mix signal E1$(t,f)$ using the waveform decoder 251 to yield the decoded down-mix signal $M_D$(t,f) 261 (also denoted as $\widehat{E1}(t,f)$ in the present document). In addition, the decoder 250 may be configured to generate decorrelated signals 264 (in the decorrelator unit 252) based on the decoded down-mix signals $M_D$(t,f) 261, e.g. by means of a one or two frame delay (denoted by t−1 and t−2), which can be written as:

$$D2(t,f)=\text{decorr2}(M_D(t,f))=M_D(t-1,f),$$

$$D3(t,f)=\text{decorr3}(M_D(t,f))=M_D(t-2,f).$$

The reconstruction of E2 and E3 may be performed using updated energy adjustment gains, which may be denoted as be2$_{new}$(t,f) and be3$_{new}$(t,f). The updated energy adjustment gains be2$_{new}$(t,f) and be3$_{new}$(t,f) may be computed according to the following formulas:

$$be2_{new}(t,f)=be2(t,f)*\text{norm}(M_D(t,f))/\text{norm}(\text{decorr2}(M_D(t,f))),$$

$$be3_{new}(t,f)=be3(t,f)*\text{norm}(M_D(t,f))/\text{norm}(\text{decorr3}(M_D(t,f))),$$

e.g.

$$be2_{new}(t,f)=be2(t,f)*\text{norm}(M_D(t,f))/\text{norm}(M_D(t-1,f)),$$

$$be3_{new}(t,f)=be3(t,f)*\text{norm}(M_D(t,f))/\text{norm}(M_D(t-2,f)).$$

An improved energy adjustment method may be referred to as a "ducker" adjustment. The "ducker" adjustment may use the following formulas to compute the updated energy adjustments gains:

$$be2_{new}(t,f)=be2(t,f)*\text{norm}(M_D(t,f))/\max(\text{norm}(M_D(t,f)),\text{norm}(\text{decorr2}(M_D(t,f)))),$$

$$be3_{new}(t,f)=be3(t,f)*\text{norm}(M_D(t,f))/\max(\text{norm}(M_D(t,f)),\text{norm}(\text{decorr3}(M_D(t,f)))),$$

e.g.

$$be2_{new}(t,f)=be2(t,f)*\text{norm}(M_D(t,f))/\max(\text{norm}(M_D(t,f)),\text{norm}(M_D(t-1,f))),$$

$$be3_{new}(t,f)=be3(t,f)*\text{norm}(M_D(t,f))/\max(\text{norm}(M_D(t,f)),\text{norm}(M_D(t-2,f))).$$

This can also be written as:

$$be2_{new}(t,f)=be2(t,f)*\min(1,\text{norm}(M_D(t,f))/\text{norm}(\text{decorr2}(M_D(t,f)))),$$

$$be3_{new}(t,f)=be3(t,f)*\min(1,\text{norm}(M_D(t,f))/\text{norm}(\text{decorr3}(M_D(t,f)))),$$

e.g $$be2_{new}(t,f)=be2(t,f)*\min(1,\text{norm}(M_D(t,f))/\text{norm}(M_D(t-1,f))),$$

$$be3_{new}(t,f)=be3(t,f)*\min(1,\text{norm}(M_D(t,f))/\text{norm}(M_D(t-2,f))).$$

In the case of the "ducker" adjustment, the energy adjustment gains be2$(t,f)$ and be3$(t,f)$ are only updated if the energy of the current frame of the down-mix signal $M_D$(t,f) is lower than the energy of the previous frames of the down-mix signal $M_D$(t−1,f) and/or $M_D$(t−2,f). In other in words, the updated energy adjustment gain is lower than or equal to the original energy adjustment gain. The updated energy adjustment gain is not increased with respect to the original energy adjustment gain. This may be beneficial in situation, where an attack (i.e. a transition from low energy to high energy) occurs within the current frame $M_D$(t,f). In such a case, the decorrelated signals $M_D$(t−1,f) and $M_D$(t−2,f) typically comprise noise, which would be emphasized by applying a factor greater than one to the energy adjustment gains be2$(t,f)$ and be3$(t,f)$. Consequently, by using the above mentioned "ducker" adjustment, the perceived quality of the reconstructed soundfield signals may be improved.

The above mentioned energy adjustment methods require as input only the energy of the decoded down-mix signal $M_D$ per sub-band f (also referred to as the parameter band f) for the current and for the two previous frames, i.e., t, t−1, t−2.

It should be noted that the updated energy adjustment gains be2$_{new}$(t,f) and be3$_{new}$(t,f) may also be determined directly at the encoder 200 and may be encoded and inserted into the spatial bit-stream 221 (in replacement of the energy adjustment gains be2$(t,f)$ and be3$(t,f)$). This may be beneficial with regards to coding efficiently of the energy adjustment gains.

As such, a frame of a soundfield signal 110 may be described by a down-mix signal E1 113, one or more sets of transform parameters 213 which describe the adaptive transform (wherein each set of transform parameters 113 describes a adaptive transform used for a plurality of sub-bands), one or more prediction parameters ae2$(t,f)$ and ae3$(t,f)$ per sub-band and one or more energy adjustment gains be2$(t,f)$ and be3$(t,f)$ per sub-band. The prediction parameters ae2$(t,f)$ and ae3$(t,f)$ and the energy adjustment gains be2$(t,f)$ and be3$(t,f)$, as well as the one or more sets of transform parameters 213 may be inserted into the spatial bit-stream 221, which may only be decoded at terminals of the teleconferencing system, which are configured to render soundfield signals. Furthermore, the down-mix signal E1 113 may be encoded using a (transform based) mono audio and/or speech encoder 103. The encoded down-mix signal E1 may be inserted into the down-mix bit-stream 222, which may also be decoded at terminals of the teleconferencing system, which are only configured to render mono signals.

As indicated above, it is proposed in the present document to determine and to apply the decorrelating transform 202 to a plurality of sub-bands jointly. In particular, a broadband KLT (e.g. a single KLT per frame) may be used. The use of a broadband KLT may be beneficial with respect to the perceptual properties of the down-mix signal 113 (therefore allowing the implementation of a layered teleconferencing system). As outlined above, the parametric coding may be based on prediction performed in the sub-band domain. By doing this, the number of parameters which are used to describe the soundfield signal can be reduced compared to parametric coding which uses a narrowband KLT, where a different KLT is determined for each of the plurality of sub-bands separately.

As outlined above, the spatial parameters may be quantized and encoded. The parameters that are directly related to the prediction may be conveniently coded using a frequency differential quantization followed by a Huffman code. Hence, the parametric description of the soundfield signal 110 may be encoded using a variable bit-rate. In cases where a total operating bit-rate constraint is set, the rate needed to parametrically encode a particular soundfield signal frame may be deducted from the total available bit-rate and the remainder 217 may be spent on 1-channel mono coding of the down-mix signal 113.

FIGS. 2*a* and 2*b* illustrate block diagrams of an example encoder 200 and an example decoder 250. The illustrated audio encoder 200 is configured to encode a frame of the soundfield signal 110 comprising a plurality of audio signals (or audio channels). In the illustrated example, the soundfield signal 110 has already been transformed from the captured domain into the non-adaptive transform domain (i.e. the WXY domain). The audio encoder 200 comprises a T-F transform unit 201 configured to transform the soundfield signal 111 from the time domain into the sub-band domain, thereby yielding sub-band signals 211 for the different audio signals of the soundfield signal 111.

The audio encoder 200 comprises a transform determination unit 203, 204 configured to determine an energy-compacting orthogonal transform V (e.g. a KLT) based on a frame of the soundfield signal 111 in the non-adaptive transform domain (in particular, based on the sub-band signals 211). The transform determination unit 203, 204 may comprise the covariance estimation unit 203 and the transform parameter coding unit 204. Furthermore, the audio encoder 200 comprises a transform unit 202 (also referred to as decorrelating unit) configured to apply the energy-compacting orthogonal transform V to a frame derived from the frame of the soundfield signal (e.g. to the sub-band signals 211 of the soundfield signal 111 in the non-adaptive transform domain). By doing this, a corresponding frame of a rotated soundfield signal 112 comprising a plurality of rotated audio signals E1, E2, E3 may be provided. The rotated soundfield signal 112 may also be referred to as the soundfield signal 112 in the adaptive transform domain.

Furthermore, the audio encoder 200 comprises a waveform encoding unit 103 (also referred to as mono encoder or down-mix encoder) which is configured to encode the first rotated audio signal E1 of the plurality of rotated audio signals E1, E2, E3 (i.e. the primary eigen-signal E1). In addition, the audio encoder 200 comprises a parametric encoding unit 104 (also referred to as parametric coding unit) which is configured to determine a set of spatial parameters ae2, be2 for determining a second rotated audio signal E2 of the plurality of rotated audio signals E1, E2, E3, based on the first rotated audio signal E1. The parametric encoding unit 104 may be configured to determine one or more further sets of spatial parameters ae3, be3 for determining one or more further rotated audio signals E3 of the plurality of rotated audio signals E1, E2, E3. The parametric encoding unit 104 may comprise a parameter estimation unit 205 configured to estimate and encode the set of spatial parameters. Furthermore, the parametric encoding unit 104 may comprise a prediction unit 206 configured to determine a correlated component and a decorrelated component of the second rotated audio signal E2 (and of the one or more further rotated audio signals E3), e.g. using the formulas described in the present document.

The audio decoder 250 of FIG. 2*b* is configured to receive the spatial bit-stream 221 (which is indicative of the one or more sets of spatial parameters 215, 216 and of the one or more transform parameters 212, 213, 214 describing the transform V) and the down-mix bit-stream 222 (which is indicative of the first rotated audio signal E1 113 or a reconstructed version 261 thereof). The audio decoder 250 is configured to provide a frame of a reconstructed soundfield signal 117 comprising a plurality of reconstructed audio signals, from the spatial bit-stream 221 and from the down-mix bit-stream 222. The decoder 250 comprises a waveform decoding unit 251 configured to determine from the down-mix bit-stream 222 a first reconstructed rotated audio signal $\widehat{E1}$ 261 of a plurality of reconstructed rotated audio signals $\widehat{E1}$, $\widehat{E2}$, $\widehat{E3}$ 262.

Furthermore, the audio decoder 250 of FIG. 2*b* comprises a parametric decoding unit 255, 252, 256 configured to extract a set of spatial parameters ae2, be2 215 from the spatial bit-stream 221. In particular, the parametric decoding unit 255, 252, 256 may comprise a spatial parameter decoding unit 255 for this purpose. Furthermore, the parametric decoding unit 255, 252, 256 is configured to determine a second reconstructed rotated audio signal $\widehat{E2}$ of the plurality of reconstructed rotated audio signals $\widehat{E1}$, $\widehat{E2}$, $\widehat{E3}$ 262, based on the set of spatial parameters ae2, be2 215 and based on the first reconstructed rotated audio signal $\widehat{E1}$ 261. For this purpose, the parametric decoding unit 255, 252, 256 may comprise a decorrelator unit 252 configured to generate one or more decorrelated signals decorr2($\widehat{E1}$) 264 from the first reconstructed rotated audio signal $\widehat{E1}$ 261. In addition, the parametric decoding unit 255, 252, 256 may comprise a prediction unit 256 configured to determine the second reconstructed rotated audio signal $\widehat{E2}$ using the formulas (1), (2) described in the present document.

In addition, the audio decoder 250 comprises a transform decoding unit 254 configured to extract a set of transform parameters d, ϕ, θ 213 indicative of the energy-compacting orthogonal transform V which has been determined by the corresponding encoder 200 based on the corresponding frame of the soundfield signal 110 which is to be reconstructed. Furthermore, the audio decoder 250 comprises an inverse transform unit 105 configured to apply the inverse of the energy-compacting orthogonal transform V to the plurality of reconstructed rotated audio signals $\widehat{E1}$, $\widehat{E2}$, $\widehat{E3}$ 262 to yield an inverse transformed soundfield signal 116 (which may correspond to the reconstructed soundfield signal 116 in the non-adaptive transform domain). The reconstructed soundfield signal 117 (in the captured domain) may be determined based on the inverse transformed soundfield signal 116.

Different variations of the above mentioned parametric coding schemes may be implemented. For example, an alternative mode of operation of the parametric coding scheme, which allows full convolution for decorrelation without additional delay, is to first generate two intermediate signals in the parametric domain by applying the energy adjustment gains be2($t,f$) and be3($t,f$) to the down-mix E1. Subsequently, an inverse T-F transform may be performed on the two intermediate signals to yield two time domain signals. Then the two time domain signals may be decorrelated. These decorrelated time domain signals may be appropriately added to the reconstructed predicted signals E2 and E3. As such, in an alternative implementation, the decorrelated signals are generated in the time domain (and not in the sub-band domain).

As outlined above, the adaptive transform 102 (e.g. the KLT) may be determined using an inter-channel covariance matrix of a frame for the soundfield signal 111 in the non-adaptive transform domain. An advantage of applying the KLT parametric coding on a per sub-band basis would be a possibility of reconstructing exactly the inter-channel covariance matrix at the decoder 250. This would, however, require the coding and/or transmission of $O(M^2)$ transform parameters to specify the transform V.

The above mentioned parametric coding scheme does not provide an exact reconstruction of the inter-channel covariance matrix. Nevertheless, it has been observed that good perceptual quality can be achieved for 2-dimensional soundfield signals using the parametric coding scheme described in the present document. However, it may be beneficial to reconstruct the coherence exactly for all pairs of the reconstructed eigen-signals. This may be achieved by extending the above mentioned parametric coding scheme.

In particular, a further parameter γ may be determined and transmitted to describe the normalized correlation between the eigen-signals E2 and E3. This would allow the original covariance matrix of the two prediction errors to be reinstated in the decoder 250. As a consequence, the full covariance of the three-dimensional signal may be reinstated. One way of implementing this in the decoder 250 is to premix the two decorrelator signals decorr2(E1($t,f$)) and decorr3(E1($t,f$)) by the 2×2 matrix given by $$G(\alpha) = \frac{1}{\sqrt{1+\alpha^2}}\begin{bmatrix} 1 & \alpha \\ \alpha & 1 \end{bmatrix},$$

-continued $$\alpha = \frac{\gamma}{1+\sqrt{1-\gamma^2}},$$

to yield decorrelated signals based on the normalized correlation γ. The correlation parameter γ may be quantized and encoder and inserted into the spatial bit-stream 221.

The parameter γ would be transmitted to the decoder 250 to enable the decoder 250 to generate decorrelated signals which are used to reconstruct the normalized correlation γ between the original eigen-signals E2 and E3. Alternatively the mixing matrix G could be set to fixed values in the decoder 250 as shown below which on average improves the reconstruction of the correlation between E2 and E3

$$G = \begin{bmatrix} 0.95 & 0.3122 \\ 0.3122 & 0.95 \end{bmatrix}.$$

The values of the fixed mixing matrix G may be determined based on a statistical analysis of a set of typical soundfield signals 110. In the above example, the overall mean of $$\frac{1}{\sqrt{1+\alpha^2}}$$

is 0.95 with a standard deviation of 0.05. The latter approach is beneficial in view of the fact that it does not require the encoding and/or transmission of the correlation parameter γ. On the other hand, the latter approach only ensures that the normalized correlation γ of the original eigen-signals E2 and E3 is maintained in average.

The parametric soundfield coding scheme may be combined with a multi-channel waveform coding scheme over selected sub-bands of the eigen-representation of the soundfield, to yield a hybrid coding scheme. In particular, it may be considered to perform waveform coding for low frequency bands of E2 and E3 and parametric coding in the remaining frequency bands. In particular, the encoder 200 (and the decoder 250) may be configured to determine a start band. For sub-bands below the start band, the eigen-signals E1, E2, E3 may be individually waveform coded. For sub-bands at and above the start band, the eigen-signals E2 and E3 may be encoded parametrically (as described in the present document).

FIG. 3*a* shows a flow chart of an example method 300 for encoding a frame of a soundfield signal 110 comprising a plurality of audio signals (or audio channels). The method 300 comprises the step of determining 301 an energy-compacting orthogonal transform V (e.g. a KLT) based on the frame of the soundfield signal 110. As outlined in the present document, it may be preferable to transform the soundfield signal 110 in the captured domain (e.g. the LRS domain) into a soundfield signal 111 in the non-adaptive transform domain (e.g. the WXY domain) using a non-adaptive transform. In such cases, the energy-compacting orthogonal transform V may be determined based on the soundfield signal 111 in the non-adaptive transform domain. The method 300 may further comprise the step of applying 302 the energy-compacting orthogonal transform V to the frame of the soundfield signal 110 (or to the soundfield signal 111 derived thereof). By doing this, a frame of a rotated soundfield signal 112 comprising a plurality of rotated audio signals E1, E2, E3 may be provided (step 303). The rotated soundfield signal 112 corresponds to the soundfield signal 112 in the adaptive transform domain (e.g. the E1E2E3 domain). The method 300 may comprise the step of encoding 304 a first rotated audio signal E1 of the plurality of rotated audio signals E1, E2, E3 (e.g. using the one channel waveform encoder 103). Furthermore, the method 300 may comprise determining 305 a set of spatial parameters ae2, be2 for determining a second rotated audio signal E2 of the plurality of rotated audio signals E1, E2, E3 based on the first rotated audio signal E1.

FIG. 3*b* shows a flow chart of an example method 350 for decoding a frame of the reconstructed soundfield signal 117 comprising a plurality of reconstructed audio signals, from the spatial bit-stream 221 and from the down-mix bit-stream 222. The method 350 comprises the step of determining 351 from the down-mix bit-stream 222 a first reconstructed rotated audio signal $\widehat{E1}$ of a plurality of reconstructed rotated audio signals $\widehat{E1}$, $\widehat{E2}$, $\widehat{E3}$ (e.g. using the single channel waveform decoder 251). Furthermore, the method 350 comprises the step of extracting 352 a set of spatial parameters ae2, be2 from the spatial bit-stream 221. The method 350 proceeds in determining 353 a second reconstructed rotated audio signal $\widehat{E2}$ of the plurality of reconstructed rotated audio signals $\widehat{E1}$, $\widehat{E2}$, $\widehat{E3}$, based on the set of spatial parameters ae2, be2 and based on the first reconstructed rotated audio signal $\widehat{E1}$ (e.g. using the parametric decoding unit 255, 252, 256). The method 350 further comprises the step of extracting 354 a set of transform parameters d, ϕ, θ indicative of an energy-compacting orthogonal transform V (e.g. a KLT) which has been determined based on a corresponding frame of the soundfield signal 110 which is to be reconstructed. Furthermore, the method 350 comprises applying 355 the inverse of the energy-compacting orthogonal transform V to the plurality of reconstructed rotated audio signals $\widehat{E1}$, $\widehat{E2}$, $\widehat{E3}$ to yield an inverse transformed soundfield signal 116. The reconstructed soundfield signal 117 may be determined based on the inverse transformed soundfield signal 116.

In the present document methods and systems for coding soundfield signals have been described. In particular, parametric coding schemes for soundfield signals have been described which allow for reduced bit-rates while maintain a given perceptual quality. Furthermore, the parametric coding schemes provide a high quality down-mix signal at low bit-rates, which is beneficial for the implementation of layered teleconferencing systems.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

What is claimed is:

1. An audio encoder configured to encode a frame of a soundfield signal comprising a plurality of audio signals, the audio encoder comprising—a transform determination unit configured to determine an energy-compacting orthogonal transform based on the frame of the soundfield signal; —a transform unit configured to apply the energy-compacting orthogonal transform to a frame derived from the frame of the soundfield signal, and to provide a frame of a rotated soundfield signal comprising a plurality of rotated audio signals;

a waveform encoding unit configured to encode a first rotated audio signal, but not a second rotated audio signal, of the plurality of rotated audio signals; and a parametric encoding unit configured to determine and encode a set of spatial parameters for determining the second rotated audio signal of the plurality of rotated audio signals based on the first rotated audio signal, wherein the set of spatial parameters enables a corresponding decoder to estimate at least one of a correlated component or a decorrelated component of the second rotated audio signal based on the first rotated audio signal.

2. The audio encoder of claim 1, wherein the parametric encoding unit is configured to determine the set of spatial parameters based on the signal model E2=ae2*E1+be2*decorr2(E1), with ae2 being a prediction parameter, be2 being an energy adjustment gain, E1 being the first rotated audio signal, E2 being the second rotated audio signal, and decorr2(E1) being a decorrelated version of the first rotated audio signal; wherein the set of spatial parameters comprises the prediction parameter and the energy adjustment gain.

3. The audio encoder of claim 1, wherein the parametric encoding unit is configured to determine a prediction parameter based on the second rotated audio signal and based on the first rotated audio signal; and the prediction parameter enables a corresponding decoder to estimate a correlated component of the second rotated audio signal based on the first rotated audio signal.

4. The audio encoder of claim 3, wherein the parametric encoding unit is configured to determine the prediction parameter such that a mean square error of a prediction residual between the second rotated audio signal and the correlated component of the second rotated audio signal is reduced.

5. The audio encoder of claim 4, wherein the parametric encoding unit is configured to determine the prediction parameter using the formula:

$$ae2=(E1^{T}*E2)/(E1^{T}*E1),$$

with E1 being the first rotated audio signal, E2 being the second rotated audio signal, ae2 being the second prediction parameter, and T indicating a vector transposition.

6. The audio encoder of claim 1, wherein the parametric encoding unit is configured to determine an energy adjustment gain based on the second rotated audio signal and based on the first rotated audio signal; and the energy adjustment gain enables a corresponding decoder to estimate a decorrelated component of the second rotated audio signal based on the first rotated audio signal.

7. The audio encoder of claim 6, wherein the parametric encoding unit is configured to determine the energy adjustment gain based on a ratio of an amplitude of the prediction residual and an amplitude of the first rotated audio signal.

8. The audio encoder of claim 7, wherein the parametric encoding unit is configured to determine the energy adjustment gain based on a ratio of the root mean square of the prediction residual and the root mean square of the first rotated audio signal.

9. The audio encoder of claim 1, further comprising a time-to-frequency analysis unit configured to convert a frame of a soundfield signal into a plurality of sub-bands, such that a plurality of sub-band signals are provided for the plurality of rotated audio signals, respectively; wherein the parametric encoding unit is configured to determine a different set of spatial parameters for each of the plurality of sub-band signals of the second rotated audio signal.

10. The audio encoder of claim 1, wherein the transform determination unit is configured to determine a covariance matrix based on the plurality of audio signals of the frame of the soundfield signal; and perform an eigenvalue decomposition of the covariance matrix to provide the energy compacting transform.

11. The audio encoder of claim 1, further comprising a non-adaptive transform unit configured to apply a non-adaptive transform to the frame of the soundfield signal to provide a transformed soundfield signal comprising a plurality of transformed audio signals; wherein the transform determination unit is configured to determine the energy-compacting orthogonal transform based on the transformed soundfield signal.

12. The audio encoder of claim 1, wherein the soundfield signal comprises at least three audio signals which are indicative at least of an azimuth distribution of talkers around a terminal of a teleconferencing system;

the parametric encoding unit configured to determine a further set of spatial parameters for determining a third rotated audio signal of the plurality of rotated audio signals based on the first rotated audio signal.

13. The audio encoder of claim 1, wherein—the audio encoder comprises a multi-channel encoding unit configured to waveform encode one or more sub-bands of the plurality of rotated audio signals; —the encoder is configured to provide a start band; —one or more sub-bands of the plurality of rotated audio signals below the start band are encoded using the multi-channel encoding unit; and—one or more sub-bands of the plurality of rotated audio signals at or above the start band are encoded using the waveform encoding unit and the parametric encoding unit.

14. The audio encoder of claim 1, wherein the waveform encoding unit is configured to encode the first rotated audio signal into a down-mix bit-stream to be provided to a corresponding decoder.

15. An audio decoder configured to provide a frame of a reconstructed soundfield signal comprising a plurality of reconstructed audio signals, from a spatial bit-stream and from a down-mix bit-stream; the decoder comprising a waveform decoding unit configured to determine from the down-mix bit-stream a first reconstructed rotated audio signal of a plurality of reconstructed rotated audio signals;

a parametric decoding unit configured to extract a set of spatial parameters from the spatial bit-stream; and determine a second reconstructed rotated audio signal of the plurality of reconstructed rotated audio signals, based on the set of spatial parameters and based on the first reconstructed rotated audio signal, wherein the set of spatial parameters enables the parametric decoding unit to estimate at least one of a correlated component or a decorrelated component of the second rotated audio signal based on the first reconstructed rotated audio signal;

a transform decoding unit configured to extract a set of transform parameters indicative of an energy-compacting orthogonal transform which has been determined by a corresponding encoder based on a corresponding frame of a soundfield signal which is to be reconstructed; and an inverse transform unit configured to apply the inverse of the energy-compacting orthogonal transform to the plurality of reconstructed rotated audio signals to yield an inverse transformed soundfield signal; wherein the reconstructed soundfield signal is determined based on the inverse transformed soundfield signal.

16. The decoder of claim 15, wherein the set of spatial parameters comprises an energy adjustment gain;

the parametric decoding unit is configured to determine a second decorrelated signal based on the first reconstructed rotated audio signal; and the parametric decoding unit is configured to determine a decorrelated component of the second reconstructed rotated audio signal by scaling the second decorrelated signal using the energy adjustment gain.

17. The decoder of claim 15, wherein the parametric decoding unit is configured to extract a plurality of sets of spatial parameters for a plurality of different sub-bands from the spatial bit-stream; and determine the second reconstructed rotated audio signal within each of the plurality of sub-bands, based on the respective set of spatial parameters and based on the first reconstructed rotated audio signal within the respective sub-band; and the transform decoding unit is configured to extract a single set of transform parameters indicative of a single energy-compacting orthogonal transform for the plurality of sub-bands.

18. The decoder of claim 15, wherein the spatial bit-stream comprises a correlation parameter indicative of a correlation between a second rotated audio signal and a third rotated audio signal derived based on the soundfield signal which is to be reconstructed, using the energy-compacting orthogonal transform;

the parametric decoding unit is configured to determine a second decorrelated signal for determining the second reconstructed rotated audio signal and a third decorrelated signal for determining a third reconstructed rotated audio signal, based on the first rotated audio signal and based on the correlation parameter.

19. The decoder of claim 15, wherein the parametric decoding unit is configured to determine a second decorrelated signal for determining the second reconstructed rotated audio signal and a third decorrelated signal for determining a third reconstructed rotated audio signal, based on the first rotated audio signal and based on a pre-determined mixing matrix; wherein the mixing matrix is determined based on a training set of second rotated audio signals and third rotated audio signals.

20. The decoder of claim 15, wherein the audio decoder comprises a multi-channel decoding unit configured to determine one or more sub-bands of the plurality of reconstructed rotated audio signals;

the decoder is configured to provide a start band;

one or more sub-bands of the plurality of reconstructed rotated audio signals below the start band are decoded using the multi-channel decoding unit; and one or more sub-bands of the plurality of reconstructed rotated audio signals at or above the start band are decoded using the waveform decoding unit and the parametric decoding unit.

* * * * *